(12) United States Patent
Josephs

(10) Patent No.: US 12,430,683 B2
(45) Date of Patent: Sep. 30, 2025

(54) DYNAMIC WEBPAGE INTERFACE

(71) Applicant: Suppliest Co. LLC, Los Angeles, CA (US)

(72) Inventor: Adam M. Josephs, Los Angeles, CA (US)

(73) Assignee: Suppliest Co. LLC, Los Angeles, CA (US)

( * ) Notice: Subject to any disclaimer, the term of this patent is extended or adjusted under 35 U.S.C. 154(b) by 0 days.

(21) Appl. No.: 18/406,108

(22) Filed: Jan. 6, 2024

(65) Prior Publication Data

US 2025/0225570 A1    Jul. 10, 2025

(51) Int. Cl.
*G06Q 30/00* (2023.01)
*G06Q 30/0601* (2023.01)

(52) U.S. Cl.
CPC ................ *G06Q 30/0641* (2013.01)

(58) Field of Classification Search
CPC ............ G06Q 30/00; G06Q 30/0601; G06Q 30/0611; G06Q 30/0641; G06Q 30/0635
See application file for complete search history.

(56) References Cited

U.S. PATENT DOCUMENTS

| | | | | |
|---|---|---|---|---|
| 8,380,880 | B2* | 2/2013 | Gulley | G06F 9/5055 709/227 |
| 2005/0197992 | A1* | 9/2005 | Kipersztok | G06F 40/30 706/50 |
| 2006/0095373 | A1* | 5/2006 | Venkatasubramanian | G06Q 20/102 705/40 |
| 2007/0038471 | A1* | 2/2007 | Meisel | G16H 10/20 705/2 |
| 2008/0037482 | A1* | 2/2008 | Douglas | H04W 24/00 370/338 |
| 2008/0235585 | A1* | 9/2008 | Hart | G06F 16/44 715/717 |
| 2008/0244376 | A1* | 10/2008 | Gottlieb | G06F 8/38 715/211 |
| 2010/0121688 | A1* | 5/2010 | Marsch | G06Q 10/0639 705/7.38 |
| 2010/0145814 | A1* | 6/2010 | Meghani | G06Q 30/06 705/26.1 |
| 2010/0299628 | A1* | 11/2010 | Har'El | G06F 9/451 715/800 |
| 2011/0131309 | A1* | 6/2011 | Akiyama | H04L 12/14 709/223 |
| 2011/0138050 | A1* | 6/2011 | Dawson | H04L 67/63 709/226 |

(Continued)

OTHER PUBLICATIONS

Gupta, Swati. "Online shopping cart application." (2013). (Year: 2013).*

(Continued)

*Primary Examiner* — Christopher B Seibert
(74) *Attorney, Agent, or Firm* — Dergosits & Noah LLP; Michael E. Dergosits

(57) ABSTRACT

A system and method provide a dynamic interface that displays multiple products or product options and accepts, from a user, one or more selections from among the displayed products or options. The dynamic interface rearranges the display and displays indications of the selections. The dynamic display may also include additional options, information, or data input fields along with each displayed indication of a selection.

17 Claims, 12 Drawing Sheets

(56) References Cited

U.S. PATENT DOCUMENTS

| | | | | |
|---|---|---|---|---|
| 2011/0138051 A1* | 6/2011 | Dawson | G06F 9/5072 | 709/226 |
| 2011/0173062 A1* | 7/2011 | Chen | G06Q 30/0241 | 705/14.35 |
| 2011/0246501 A1* | 10/2011 | McMenamin | G16B 50/00 | 707/769 |
| 2011/0276590 A1* | 11/2011 | Hayes | G06Q 10/107 | 707/769 |
| 2012/0054603 A1* | 3/2012 | Demant | G06F 3/0485 | 715/247 |
| 2012/0089486 A1* | 4/2012 | Mahakian | G06Q 30/0635 | 705/26.81 |
| 2012/0226808 A1* | 9/2012 | Morgan | G06Q 30/04 | 709/226 |
| 2012/0304191 A1* | 11/2012 | Morgan | G06F 9/5088 | 718/105 |
| 2013/0042005 A1* | 2/2013 | Boss | H04L 43/0876 | 709/226 |
| 2013/0097480 A1* | 4/2013 | Allison | G06Q 10/10 | 715/223 |
| 2013/0166334 A1* | 6/2013 | Liberty | G06Q 10/02 | 705/26.61 |
| 2013/0169566 A1* | 7/2013 | Vargas | G06F 21/34 | 345/173 |
| 2014/0006978 A1* | 1/2014 | Meehan | G11B 27/034 | 715/760 |
| 2014/0172805 A1* | 6/2014 | Leung | G06Q 10/10 | 707/692 |
| 2014/0214937 A1* | 7/2014 | Giacobbe | G06Q 10/06311 | 709/204 |
| 2014/0223311 A1* | 8/2014 | Auer | G06F 3/0482 | 715/730 |
| 2014/0229860 A1* | 8/2014 | Rogers | G06Q 10/06311 | 715/753 |
| 2015/0024792 A1* | 1/2015 | Granito | H04L 51/58 | 455/457 |
| 2015/0039461 A1* | 2/2015 | Gadre | G06Q 30/0635 | 705/26.81 |
| 2015/0160989 A1* | 6/2015 | Maes | G06Q 30/0276 | 719/313 |
| 2015/0237128 A1* | 8/2015 | Castro | H04L 67/04 | 726/4 |
| 2015/0347533 A1* | 12/2015 | Shakirzianov | G06F 8/20 | 717/104 |
| 2016/0048307 A1* | 2/2016 | Troyer | G06F 9/454 | 715/801 |
| 2016/0091337 A1* | 3/2016 | Weast | A61B 5/02438 | 701/439 |
| 2016/0247119 A1* | 8/2016 | Goates | G06Q 10/1053 | |
| 2016/0283925 A1* | 9/2016 | Lavu | G06Q 20/401 | |
| 2016/0364772 A1* | 12/2016 | Denton | G06Q 30/0242 | |
| 2017/0052652 A1* | 2/2017 | Denton | G06Q 50/01 | |
| 2018/0032997 A1* | 2/2018 | Gordon | G06Q 30/0269 | |
| 2018/0225748 A1* | 8/2018 | Selcuk | G06Q 30/0601 | |
| 2018/0276404 A1* | 9/2018 | Dotan-Cohen | G06F 21/6245 | |
| 2018/0336730 A1* | 11/2018 | Bastian | G06T 15/503 | |
| 2018/0344919 A1* | 12/2018 | Jones | G09B 23/303 | |
| 2018/0365278 A1* | 12/2018 | Klöhn | G06F 16/51 | |
| 2019/0095507 A1* | 3/2019 | Elisseeff | G06N 5/01 | |
| 2019/0177993 A1* | 6/2019 | Shell | E04H 1/12 | |
| 2019/0180875 A1* | 6/2019 | Gagne | G16H 10/20 | |
| 2020/0089396 A1* | 3/2020 | Shrivastava | G06F 3/0481 | |
| 2020/0118062 A1* | 4/2020 | Greenwell | G06Q 10/1091 | |
| 2020/0177710 A1* | 6/2020 | Wyatt | G06F 9/451 | |
| 2020/0242575 A1* | 7/2020 | Shell | A61L 2/22 | |
| 2021/0158420 A1* | 5/2021 | Canfield | G06F 16/953 | |
| 2021/0357209 A1* | 11/2021 | Ramachandra | G06F 40/174 | |
| 2022/0237672 A1* | 7/2022 | Tang | G06Q 30/0603 | |
| 2024/0062279 A1* | 2/2024 | Scully | G06F 3/013 | |

OTHER PUBLICATIONS

Chitturi, Sushma Reddy. "MyBookStore—eshopping for books." (2010). (Year: 2010).*
Screenshots downloaded Feb. 21, 2024 from www.shirtmax.com/t-shirts/gildan/g500-heavy-cotton-5-3-oz-t-shirt.html?color=3.
Screenshots downloaded Feb. 24, 2024 from www.jiffyshirts.com/gildan-G500.html?ac=White.
Screenshots downloaded Feb. 24, 2024 from www.alphabroder.com/express-order.
Screenshots downloaded Feb. 24, 2024 from www.customink.com/ndx/PK=176102&SK=176100&prefer_singles=false#/.
Screenshots downloaded Feb. 24, 2024 from www.4imprint.com/product/6729-S-C/Hanes-Authentic-T-Shirt-Screen-Colors.
Screenshots downloaded Feb. 24, 2024 from www.amazon.com/Gildan-Jersey-T-Shirt-Forest-XXXX-large/dp/B01EGLF6YI/.
Screenshots downloaded Feb. 24, 2024 from www.amazon.com/New-Balance-Primary-Sneaker-Toddler/dp/B09YBDMG6L/.
Screenshots downloaded Feb. 24, 2024 from www.gap.com/browse/product.do?pid=8812500120003#pdp-page-content.
Screenshots downloaded Feb. 24, 2024 from shop.lululemon.com/p/mens-t-shirts/Heavyweight-Cotton-Jersey-LS-Shirt/_/prod11680086?color=46696&locale=en_US&sl=US&sz=M.

* cited by examiner

DYNAMIC WEBPAGE INTERFACE

BACKGROUND

In a typical interface for placing an order with a website, a user may begin, for example, by identifying a desired product after browsing the website's homepage or multi-product pages, utilizing the website's search function, or clicking a link from a third-party website. Once the user identifies a desired product, the user may then be presented with a webpage for that particular product and may be presented with a number of product options, e.g., color, size, quantity. After making appropriate selections, the user may add the selected product with the selected set of options to a virtual shopping cart. To order that particular product with a second set of options, the user must either return to the webpage for the particular product or, if still on the webpage after adding the product with the initial set of options to the virtual shopping cart, select the second set of options for the product. To order a second product from the website, the user returns to the website's homepage or multi-product pages, or utilizes its search function, and starts the process again.

Consequently, to order a number of different products or to order a number of the same product with different product options, the user typically must either navigate back and forth between webpages, or repeatedly select an individual set of product options and add the product with those options to the virtual shopping cart before the next set of product options can be selected. The repetition is undesirable. In addition, in the process of navigating between pages or selecting different sets of product options to replace the ones previously selected and added to the virtual shopping cart, the user may lose track of which products or which product options have been ordered, which can only increase the undesirable nature of the process.

To avoid requiring a user, when seeking to order a number of the same product with different product options, to repetitively navigate between webpages or to add each iteration of the product with a different set of selected options to the virtual shopping cart one-by-one, certain websites include on a webpage for a product a static, fully expanded order form wherein all product options for that product are listed out and can be selected or receive inputs-thus allowing the same product with different product options to be added to the website's virtual shopping cart at once. However, this type of static order form, displaying and permitting user input on all product options simultaneously, has its own major drawbacks. Product options for a given product can easily number in the dozens, if not hundreds, requiring a much more cumbersome webpage for the product, with greater dimensions and which is more difficult to navigate and utilize. A user may be forced to scroll through, or search through, a multitude of lines of product options even if only interested in a single product option. Further, even when selecting or inputting for various product options, the other, unused product option lines remain visible to the user, making it difficult or impossible for the user to efficiently review the product options that have been selected on the webpage. This is undesirable and makes for a suboptimal purchasing process. The static, fully expanded order form webpage creates as many problems as it solves.

Thus, what is needed are methods and systems that simplify the process of ordering a number of different products and ordering a number of the same product with different options.

DETAILED DESCRIPTION

Embodiments provide systems and dynamic interfaces that may display, on a single dynamic webpage, a group of products, or a group of product options, or both. In an embodiment, while displaying the group or groups, a dynamic webpage may receive an initial selection from a group and display an indication of the selection. While displaying the group or groups and the indication of the initial selection, the dynamic interface may further display one or more options regarding the initial selection. From this display, the user may further select from the initially displayed groups, or provide input regarding the selection. When the user makes an additional selection from an initially displayed group, the dynamic webpage may display an indication of the additional selection simultaneously with the group or groups and the indication of the initial selection. Thus, the dynamic webpage may build a custom order form that, in a glance, indicates the totality of the order. In an embodiment, in the process of making selections to build this custom order form, the dynamic webpage may rearrange the selections so that more recent selections are more prominently located on the webpage and previous selections are relegated to less prominent locations. In an embodiment, in the process of building this custom order form, the dynamic webpage may re-size the selections (e.g., the selection indication and associated text and data fields) so that a more recent selection is a first size and previous selections are smaller. As a result, embodiments simplify the process of ordering a number of different products, ordering a number of the same product with different options, or both, by building a custom order form that displays each selection and the associated information along with the initial group or groups. This reduces the repetition and inefficiency of the prior art and provides, at a glance, a history of the user's choices.

Figure 1A:
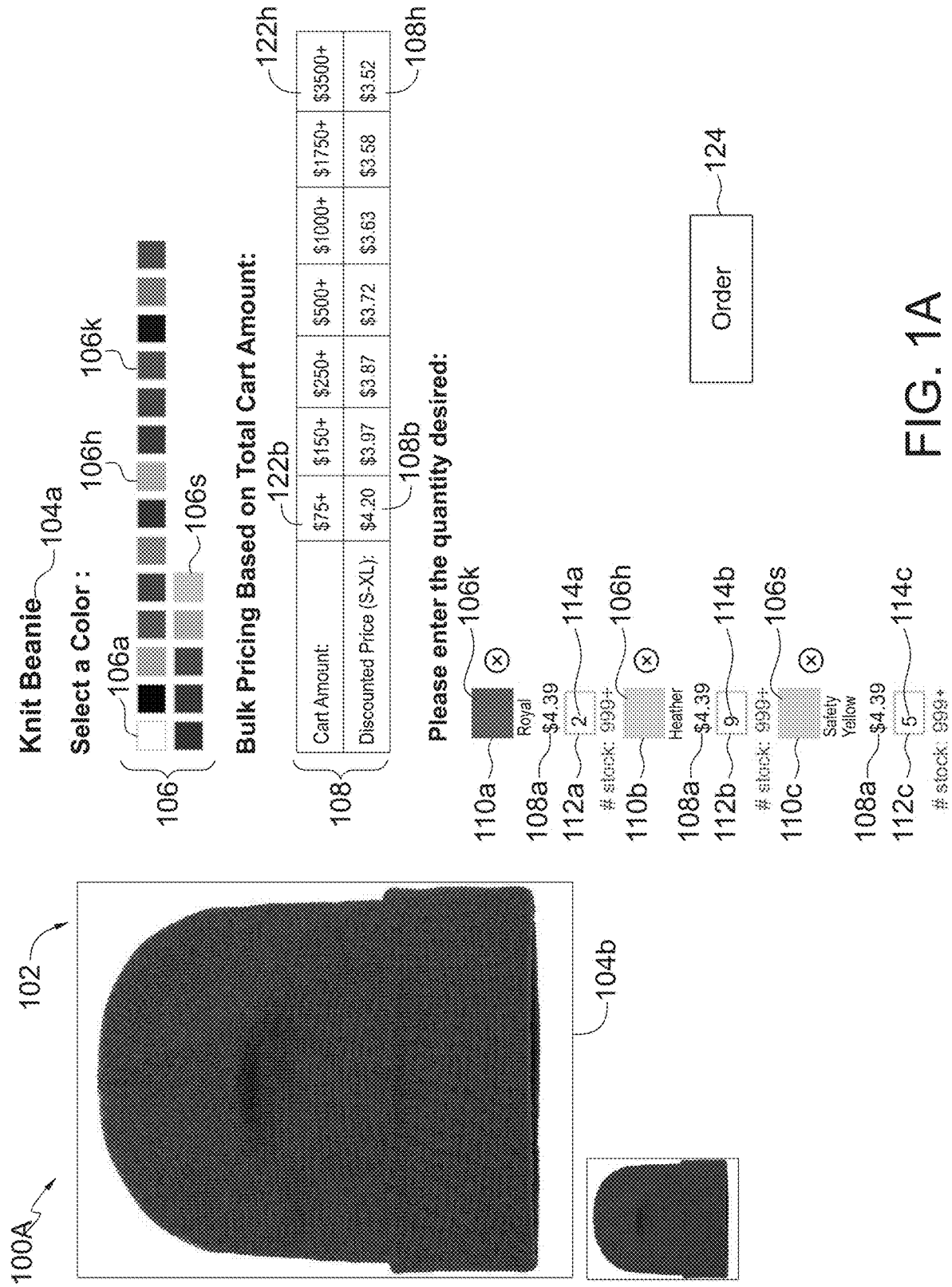
FIG. 1A is a screenshot of an embodiment of a dynamic webpage interface.

FIG. 1A is a screenshot 102 of an embodiment of a dynamic webpage interface 100A. In FIG. 1A, dynamic webpage interface 100A displays a product type 104a, product image 104*b*, associated product options including color options 106 (including colors 106*a* . . . 106*s*), and bulk pricing information 108 (including bulk cart amounts 122*a*, 122*b* . . . 122*h* and associated prices 108*b* . . . 108*h*).

Screenshot 102 displays dynamic webpage interface 100A after three selections from colors 106 have been made. That is, initially, dynamic webpage interface 100A displayed product type 104*a* and color options 106 (including colors 106*a* . . . 106*s*); and an initial product image 104*b* and bulk pricing information 108 (including bulk cart amounts 122*a*, 122*b* . . . 122*h* and associated prices 108*b* . . . 108*h*) associated with an initial pre-selected color option (e.g., product 104*b* in color 106*a*). In an embodiment, no color option would be pre-selected and all selections would be made by a user. Then, after receiving a selection of color 106*s* from a user, e.g., by the user clicking on color 106*s*, dynamic webpage interface 100A removed the selection indicator associated with the initial pre-selected color option, and displayed a selection indicator 110*c*, which in the embodiment is a swatch of the selected color 106*s*. In addition, dynamic webpage interface 100A displayed a name of the swatch, a product image 104*b* in that product/color 106*s* combination, bulk pricing information 108 for that product/color 106*s* combination and an associated price 108*a* based on the current total dollar amount in the virtual shopping cart and of the quantities entered on the webpage (i.e., from $0.00 to $74.99), a field 112*c* for accepting a quantity of selection 110*c*, and a number of such items that were in stock. Being the initial selection, selection indicator 110*c*, price 108*a*, and quantity field 112*c* were originally located more prominently, i.e., just below pricing information 108. Dynamic webpage interface 100A then received a quantity "5" 114*c* from the user in quantity field 112*c*. After the initial selection, dynamic webpage interface 100A received a selection of color 106*h* from the user and displayed: a selection indicator 110*b*, which in the embodiment is a swatch of the selected color 106*h*; a name of the swatch; a product image 104*b* in that product/color 106*h* combination; bulk pricing information 108 for that product/color 106*h* combination and an associated price 108*a* based on the current total dollar amount in the virtual shopping cart and of the quantities entered on the webpage (i.e., from $0.00 to $74.99); a field 112*b* for accepting a quantity of selection 110*c*; and a number of such items that were in stock. Being the more recent selection, selection indicator 110*b*, associated price 108*a*, and quantity field 112*b* were displayed in the more prominent location below pricing information 108 and selection indicator 110*c* and associated elements were moved down. Dynamic webpage interface 100A then received a quantity "9" 114*b* from the user in quantity field 112*b*. After the second selection, dynamic webpage interface 100A received a selection of color 106*k* from the user and displayed: a selection indicator 110*a*, which in the embodiment is a swatch of the selected color 106*k*; a name of the swatch; a product image 104*b* in that product/color 106*k* combination; bulk pricing information 108 for that product/color 106*k* combination and an associated price 108*a* based on the current total dollar amount in the virtual shopping cart and of the quantities entered on the webpage (i.e., from $0.00 to $74.99); a field 112*a* for accepting a quantity of selection 110*c*; and a number of such items that were in stock. Being the more recent selection, selection indicator 110*a*, associated price 108*a*, and quantity field 112*a* were displayed in the more prominent location below pricing information 108, selection indicator 110*b* and associated elements were moved down, and selection indicator 110*c* and associated elements were moved down, which resulted the arrangement shown in screenshot 102. Dynamic webpage interface 100A then received a quantity "2" 114*a* from the user in quantity field 112*a*. Thus, FIG. 1A illustrates that dynamic webpage interface 100A expands to accommodate additional user selections and may rearrange in the expanding, e.g., to make more recent selections more prominent. In an embodiment, previous selections and their associated elements may be moved to a sidebar with more recent selection at the top of the sidebar. In an embodiment, dynamic webpage interface 100A may re-size previous selections and their associated elements (e.g., selection indicator 110*c*, associated price 108*a*, quantity field 112*c*, and quantity 114*c*) so that more recent selection indicator and associated elements are larger in addition to being more prominently located.

Figure 3:
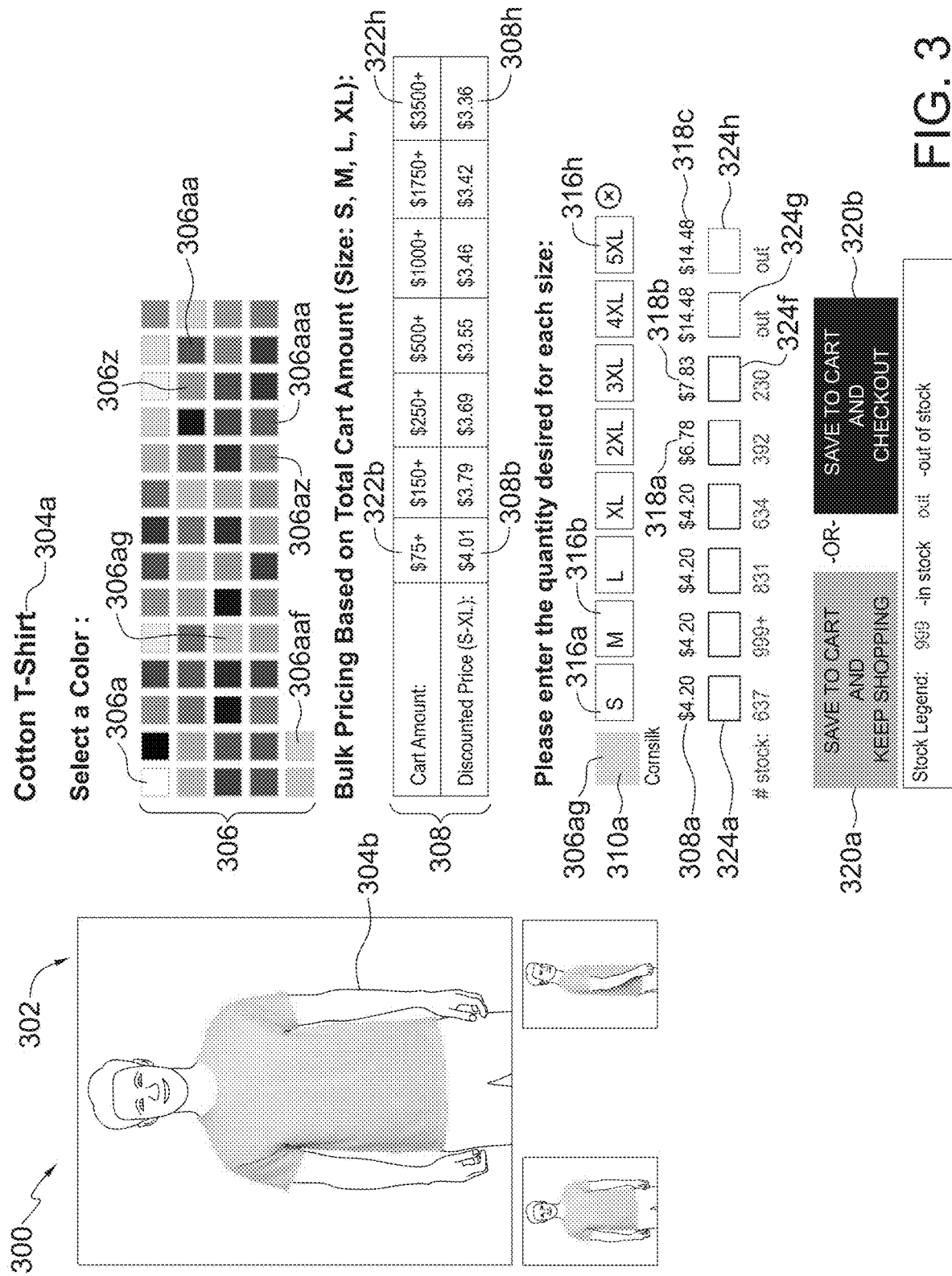
FIG. 3 is a screenshot of an embodiment of a dynamic webpage interface.

In the embodiment, quantity fields 112*a* . . . 112*c* are shown provided with user-selected quantities 114*a* . . . 114*c*. Each field 112*a* . . . 112*c* for a given product option was populated by the user with its respective quantity 114*a* . . . 114*c* prior to the selection of the next product option. For example, quantity field 112*c* was populated with quantity "5" 114*c* before color 106*h* was selected. In the embodiment, if no quantity is provided by the user for a selection, that selection indicator disappears upon the user's selection of a different product option. In other words, in the embodiment, the user must input a quantity for a selection indicator in order for dynamic webpage interface 100A to "hold" that selection indicator (i.e., for that selection indicator to remain on the display) after a different color 106 is selected. On screenshot 102 a user may select an order link 124 that may effectuate an immediate order, or that may save the selection for later a later check-out, such as a save-to-cart-and-keep-shopping link 320*a* (FIG. 3) or a save-to-cart-and-check-out link 320*b* (FIG. 3).

In an embodiment, the user may have initially selected color 106*k*, then color 106*h*, then color 106*s*, with the user adding each subsequent selection indicator and associated elements to the display below the previous selection.

In an embodiment, pricing information 108 and all of the data and fields accompanying the selection indicators 110*a* . . . 110*c* may be optional, such that the selection of a color 106, e.g., 106*s*, conveys all the necessary information needed to order that product, e.g., the selection may automatically indicate a single such product is to be ordered, there are no additional product options (e.g., product size), and the purchase price may appear in a cart or when checking out, or both.

In an embodiment, after a selection is made, e.g., of color 106*s*, that color may be highlighted in colors 106 or otherwise emphasized, or may be deleted from colors 106 or otherwise de-emphasized, to indicate to the user that the color has already been selected.

In an embodiment, each selection indicator 110*a* . . . 110*c* may be an image of the selected product 104*b* in the color of the selection.

Figure 1B:
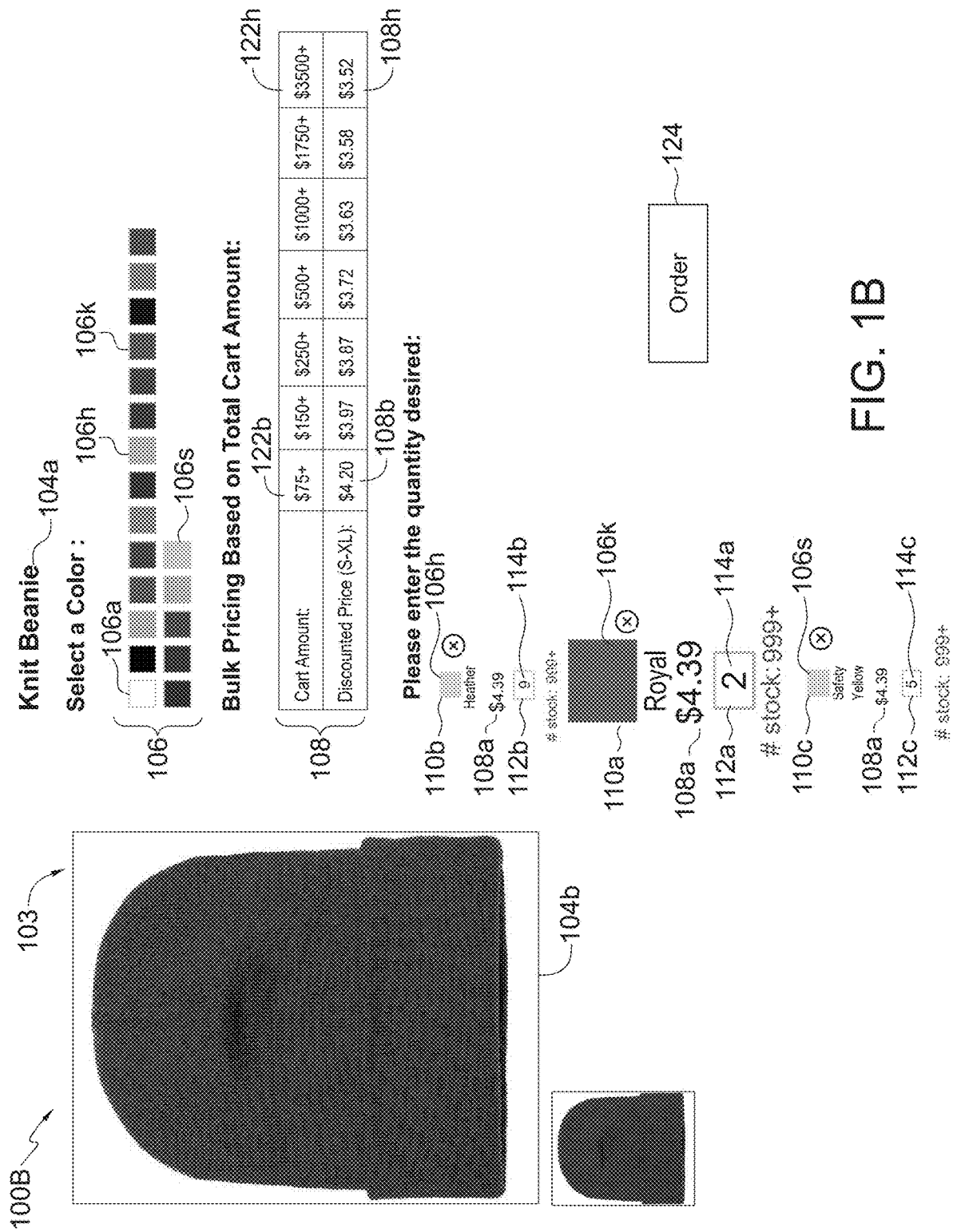
FIG. 1B is a screenshot of an embodiment of a dynamic webpage interface.

FIG. 1B is a screenshot 103 of an embodiment of a dynamic webpage interface 100B. In FIG. 1B, dynamic webpage interface 100B is the same as dynamic webpage interface 100A and screenshot 102 except that, with dynamic webpage interface 100B, the most recent selection and related fields are made more prominent by being shown larger than previous selections and related fields, and the relative order of selection is not indicated by location. Thus, in screenshot 103: the larger size of selection indicator 110*a* indicates that it is the most recent selection; and selection indicators 110*b* and 110*c* indicate prior selections. In this embodiment, the associated text and quantity fields are similarly re-sized; however in other embodiments the selection indicator may be the only re-sized element. Also, in this embodiment, the selection indicators are arranged alphabetically by color name—the most recent selection "Royal" has been added in between the selection indicators for "Heather" and "Safety Yellow" because it falls in the middle of the other two alphabetically—but other embodiments may arrange the selection indicators using any number of other criteria (e.g., by price, category, sale status, etc.). Further, another embodiment may combine the re-sizing feature of dynamic webpage interface 100B with the feature of dynamic webpage interface 100A, in which the most recent selection is placed in the more prominent location and preceding selections are moved to have a dynamic webpage interface in which the most recent selection is indicated by both being in a more prominent location and by being larger (e.g., having a larger selection indicator) in comparison to past selections. This combination of features from dynamic webpage interfaces 100A and 100B illustrates that one or more features disclosed with reference to one embodiment in this disclosure may be combined with one or more features from a different embodiment to create additional embodiments. For example, each dynamic webpage interface disclosed may size the selection indicators to show the most recent selection indicator as relatively larger than other selection indicators in addition to displaying the most recent selection indicator in the more prominent location. In addition, each dynamic webpage interface disclosed may size the selection indicators to show the most recent selection relatively larger than previous selections, but not in a more prominent location (e.g., in its alphabetical position, as in FIG. 1B).

Figure 2:
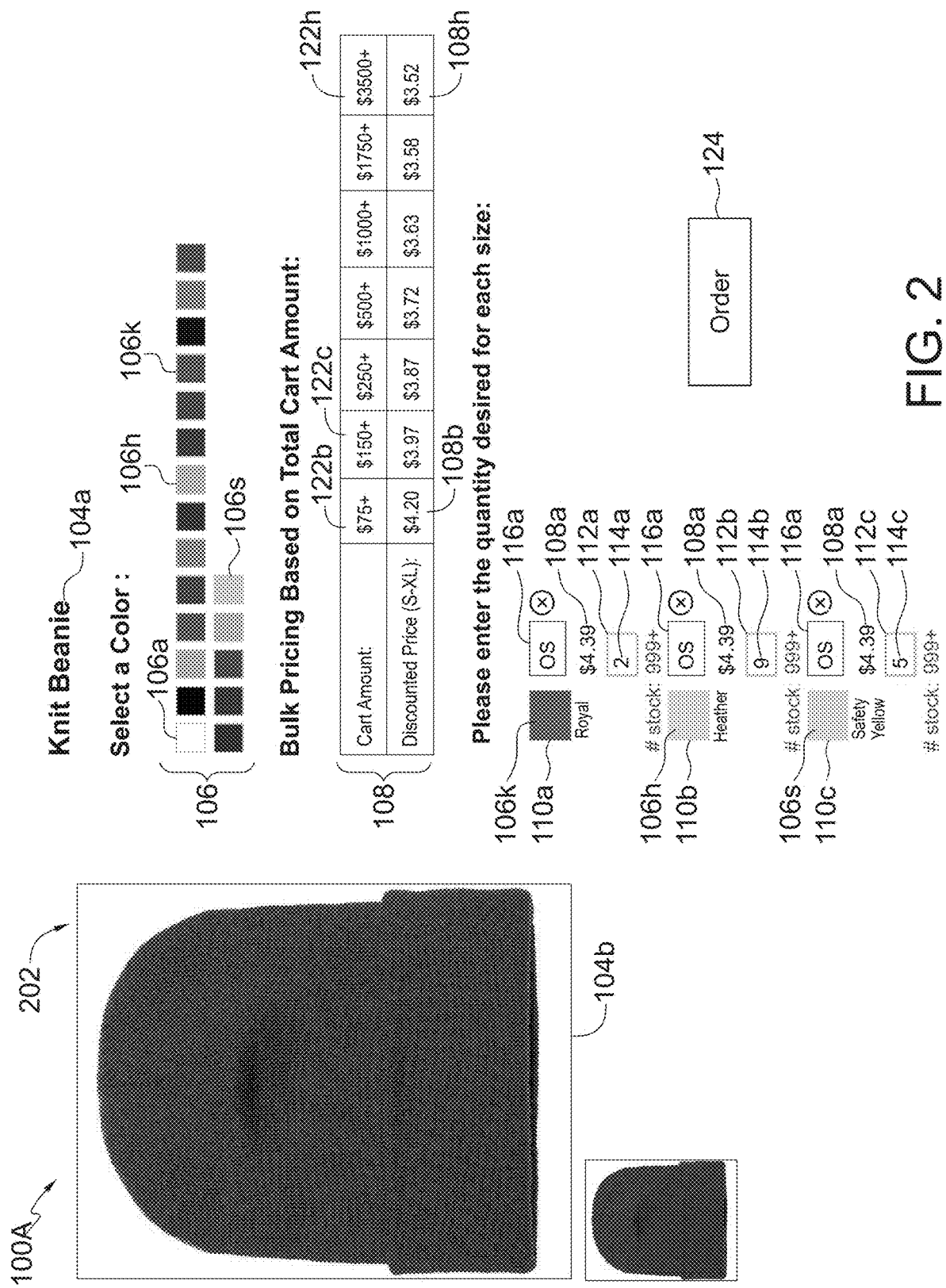
FIG. 2 is a screenshot of an embodiment of a dynamic webpage interface of FIG. 1A.

FIG. 2 is a screenshot 202 of the embodiment of dynamic webpage interface 100A of FIG. 1A. In FIG. 2, each selection indicator 110a . . . 110c is provided with associated size information 116a (i.e., "OS", signifying "One Size"). FIG. 2 illustrates that additional fields or information may be included with each selection indicator that does not prompt or request a response from the user.

In the embodiment, product 104a, colors 106a . . . 106s, and quantity fields 112a . . . 112c are exemplary. The embodiment may be used to order products and services with different characteristics, e.g., gravel, where the group of options include a relative granularity and the quantity field accepts a weight; lumber, where the group of options includes wood types and the quantity fields accept board feet; spa services, where the group of options includes types of treatments and the quantity fields accept length of time for the treatment, etc.

Figure 4:
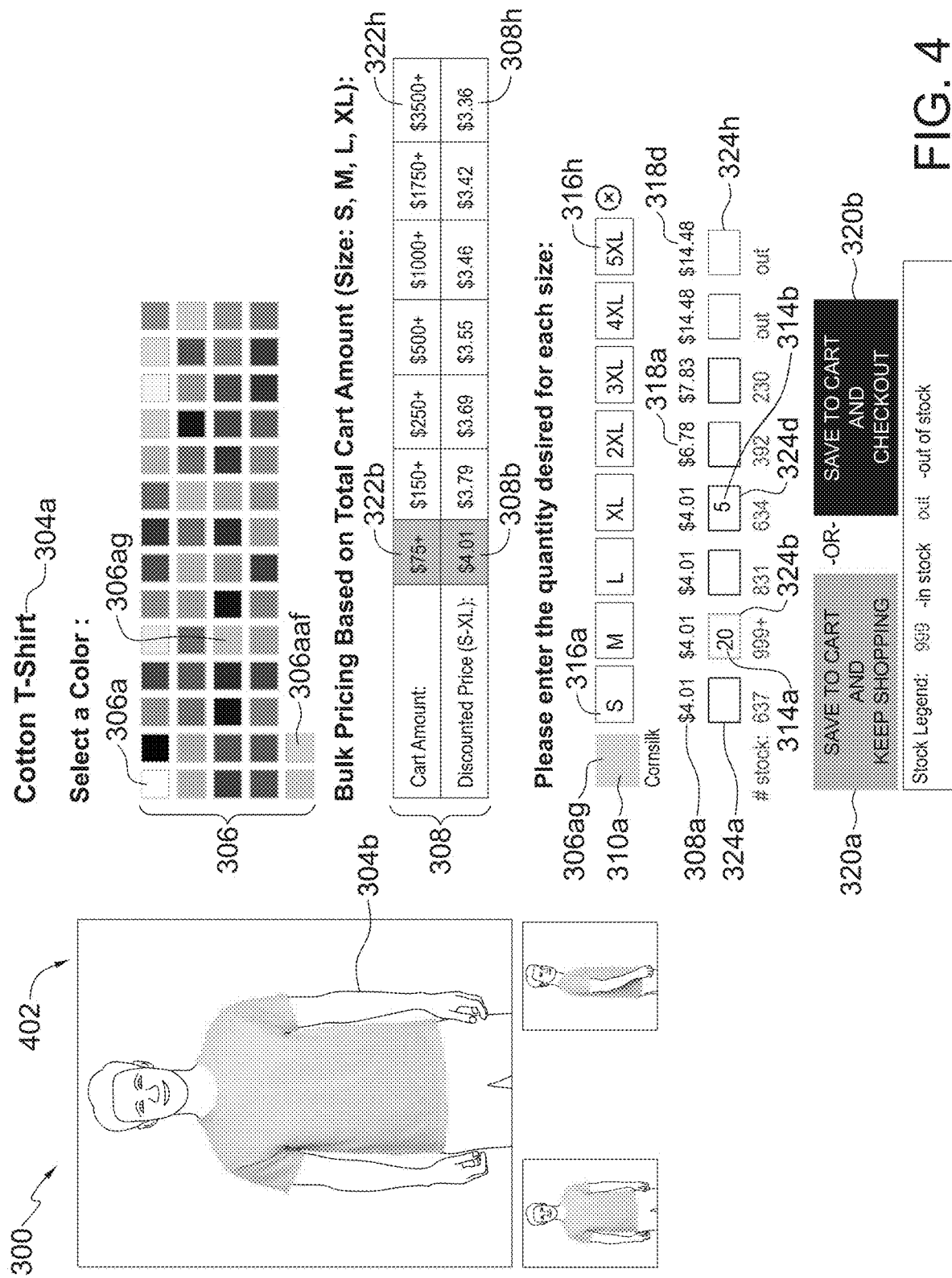
FIG. 4 is a screenshot of an embodiment of a dynamic webpage interface of FIG. 3.
Figure 5:
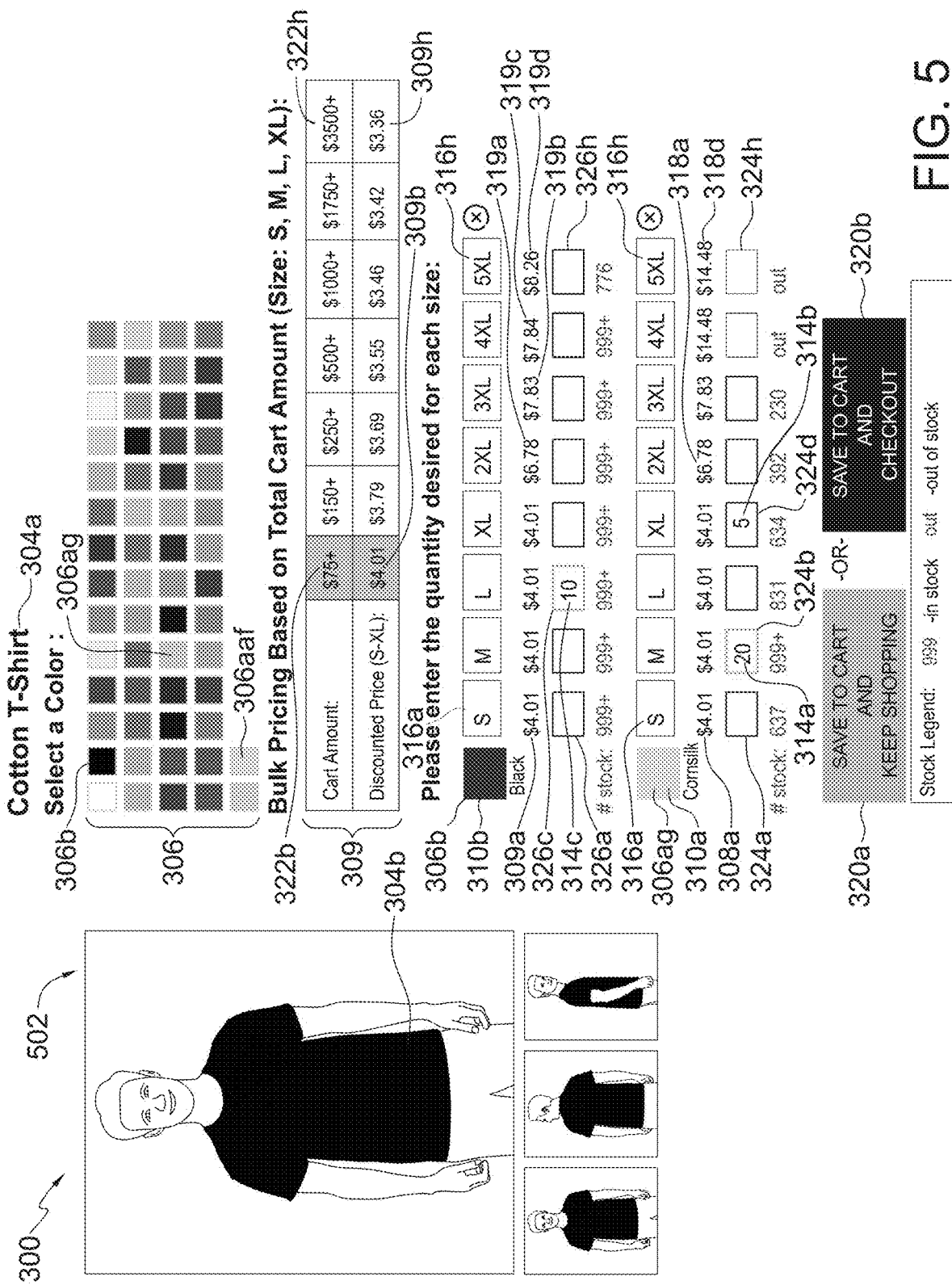
FIG. 5 is a screenshot of an embodiment of a dynamic webpage interface of FIG. 3.

FIG. 3 is a screenshot 302 of an embodiment of a dynamic webpage interface 300. FIG. 3 through FIG. 5 illustrate an embodiment of a method of ordering using dynamic webpage interface 300. In FIG. 3, dynamic webpage interface 300 displays a product type 304a; product image 304b; associated product options including color options 306 (including colors 306a . . . 306aaf); and bulk pricing information 308 (including bulk cart amounts 322a, 322b . . . 322h and associated prices 308b . . . 308h). Screenshot 302 displays dynamic webpage interface 300 after an initial selection of a product option, i.e., color 306ag.

Initially, dynamic webpage interface 300 may have displayed product type 304a and color options 306 (including colors 306a . . . 306s); and an initial product image 304b and bulk pricing information 308 (including bulk quantities 322a, 322b . . . 322h and associated prices 308b . . . 308h) associated with an initial pre-selected color option, e.g., product 304a in color 306a. Then, after receiving a selection of color 306ag from a user, e.g., by the user clicking on color 306ag, dynamic webpage interface 300 then displayed a selection indicator 310a, which in the embodiment is a swatch of the selected color 306ag. In addition, dynamic webpage interface 300 displayed: a name of the swatch; a product image 304b in that product/color 306ag combination; an additional set of product options associated with the selected color (sizes 316a . . . 316h); prices 308a, 318a . . . 318c for that product/color/size combination based on the current total dollar amount in the virtual shopping cart and of the quantities entered on the webpage (i.e., from $0.00 to $74.99); fields 324a . . . 324h for accepting a quantity of selection 310a for each size 316a . . . 316h, and a number of such items that were in stock in each size. FIG. 3 illustrates that additional product options and associated fields may be included with each selection indicator to receive quantity inputs from the user for various combinations of product and product options. Being the initial selection, selection indicator 310a, sizes 316a . . . 316h, prices 308a, 318a . . . 318d; and quantity fields 324a . . . 324h are located prominently, i.e., just below pricing information 308. On screenshot 302, if a quantity is provided in any of quantity fields 324a . . . 324h, a user may select an order link, such as a save-to-cart and keep shopping link 320a, or a save-to-cart-and-check-out link 320b. As shown in FIG. 3, in the embodiment, because no quantity has been entered in any quantity field 324a . . . 324h, if the user selects a different color 306, then selection indicator 310a will disappear and be replaced with a selection indicator of the newly selected color. All fields associated with selection 310a would be updated to contain information associated with the newly selected color option.

Figure 6:
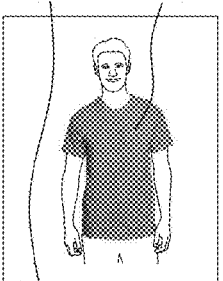
FIG. 6 is a screenshot of an embodiment of a dynamic webpage interface.
Figure 6:
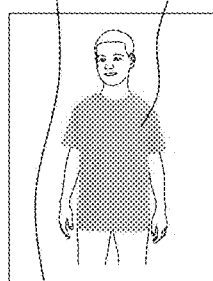
Figure 6:
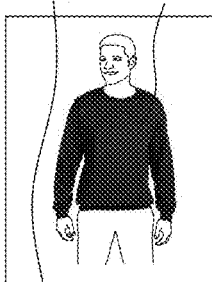
Figure 6:
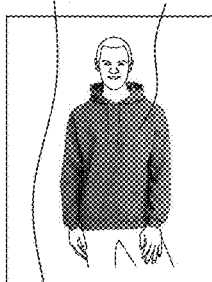

In an embodiment, accompanying a selection indicator, a user may be provided with a limited set of options from which to make a selection (e.g., by means of a button group, radio buttons, pulldown menu, or other field) in order to specify the combination of product and product options; this may be in lieu of any fields to receive quantity (in which case, selection would indicate a single such product is to be ordered), or in addition to such quantity fields (e.g., pulldown menu 606 in FIG. 6).

FIG. 4 is a screenshot 402 of dynamic webpage interface 300 after the user has entered a quantity "20" 314a in quantity field 324b and a quantity "5" 314b in quantity field 324d. Shading of the fields associated with pricing information 322b and price 308b indicates the current price based on the current total dollar amount in the virtual shopping cart and of the quantities entered on the webpage (which, with the entered quantity totaling 25, now falls within the $75.00 to $149.99 pricing tier). In an embodiment, because a quantity has been entered in any quantity field 324a . . . 324h, selection indicator 310a and associated information will not disappear or be replaced upon the user selecting an additional color variant 306.

FIG. 5 is a screenshot 502 of dynamic webpage interface 300 after the user has selected an additional product option, color 306b. As a result of the selection of color 306b, and because the user had entered a quantity in one of quantity fields 324a . . . 324h, dynamic interface 300 replaced product image 304b in the previous color selected (color 306ag) with a product image 304b in the newly selected product/color 306b combination, and displayed updated bulk pricing information 309 for that product/color 306b combination. Dynamic webpage interface 300 also moved selection indicator 310a and the associated fields to a less prominent location-lower on the display. In the more prominent location, dynamic interface 300 displayed: a selection indicator 310b (a swatch of the selected color 306b); a name of the swatch ("Black"); sizes 316a . . . 316h associated with selection indicator 310b; prices 309a, 319a . . . 319d for that product/color/size combination based on the current total dollar amount in the virtual shopping cart (i.e., from $75.00 to $149.99); fields 326a . . . 326h for accepting a quantity of selection 310b for each size 316a . . . 316h, and a number of such items that were in stock in each size. In FIG. 5, the user has entered a quantity "10" 314c in quantity field 326c. Shading of the fields associates with pricing information 322b and price 309b indicates the current price based on the current total dollar amount in the virtual shopping cart and of the quantities entered on the webpage (the $75.00 to $149.99 pricing tier). As before, because quantity 314c has been entered in quantity field 326c, and quantities 314a and 314b have been entered in quantity fields 324b, 324d, dynamic interface 300 will continued to display selection indicators 310b and 310a and their associated information upon the user selecting an additional color option 306.

Regarding FIG. 3, FIG. 4, and FIG. 5, the user may repeat the selection of product options, colors 306, and input desired quantities of different color/size combinations until satisfied. In addition, the user may return to the selection indicator for any previously selected color, e.g., selection indicator 310a, and modify the quantities in any quantity field. When complete, the user may select an order link, e.g., save to cart and keep shopping 320a or save to cart and checkout 320b, as desired.

In an embodiment, if a user selects a color option 306 for a previously selected color option for which the selection indicator and associated text and fields are already displaying on the webpage, that selection indicator and associated text and fields may relocate to the most prominent location typically reserved for new selections, and the remaining selection indicators and associated text and fields may be relegated to less prominent locations. In an embodiment, if a user selects a color option 306 for a previously selected color option for which the selection indicator and associated text and fields are already displaying on the webpage, that selection indicator and associated text and fields may be re-sized so that they are a first size typically reserved for new selections, and the remaining selection indicators and associated text and fields may be smaller.

In the embodiment, as with dynamic webpage interface 100A, 100B and the interface embodiments to follow, product 304a, colors 306a . . . 306s, and quantity fields 324a . . . 324h, 326a . . . 326h are exemplary. The embodiment may be used to order products and services with different characteristics, e.g., gravel, where the group of options include a relative granularity, and the quantity field accepts a weight; lumber, where the group of options includes wood types and the quantity fields accept board feet; spa services, where the group of options includes types of treatments and the quantity fields accept length of time for the treatment, etc.

FIG. 6 is a screenshot 602 of an embodiment of a dynamic webpage interface 600. FIG. 6 illustrates an embodiment of a dynamic webpage interface that allows a user to create a custom quick-order form that is similar to dynamic webpage interface 300 with an added feature that dynamic webpage interface 600 provides for having rows with different product types (e.g., any of products 604a . . . 604d) and different product options within a product type (e.g., product 604a in both color 606a (selection indicator 610c) and color 606b (selection indicator 610b)). In FIG. 6, dynamic webpage interface 600 may display a product type 604a . . . 604d and product image 605a . . . 605d and associated product information including: a starting price, a bulk price ("as low as . . . "); and additional information (e.g., "White: $3.32").

Screenshot 602 displays dynamic webpage interface 600 after three selections have been made, indicated by selection indicators 610a, 610b, 610c. After the first selection of product 604d, Adult Heavy Blend 50/50 Hooded Sweatshirt, dynamic webpage interface 600 displayed selection indicator 610a and, associated with indicator 610a: product type 604d, and a pulldown menu 606 of product options (colors). Upon the user selecting color 606b (black), interface 600 further displayed information for the product/color option combination, including: sizes 613a . . . 613i, associated prices 608a . . . 608h, quantity fields 624a . . . 624i, and number of such items that were in stock in each size. The user then entered a quantity 614c of "10" in quantity field 624d, which resulted in dynamic webpage interface 600 "holding" selection 610a upon the user making a second selection, rather than disappearing had no quantities had been entered.

After the second user selection of product 604a, Adult Heavy Cotton T-Shirt, dynamic webpage interface 600 displayed selection indicator 610b and, associated with indicator 610b: product type 604b, and pulldown menu 600 of product options (colors). Upon the user selecting color 606b (the color Black), dynamic webpage interface 600 further displayed information for the product/color option combination, including: sizes 615a . . . 615i, associated prices 609a . . . 609h, quantity fields 626a . . . 626i, and number of such items that were in stock in each size. The user then entered a quantity 614b of "10" in quantity field 626b, which resulted in dynamic webpage interface 600 "holding" selection 610b (i.e., not having it disappear) upon the user making a third selection.

After the third user selection-again of product 604a, Adult Heavy Cotton T-Shirt-dynamic webpage interface 600 displayed selection indicator 610c and, associated with indicator 610c: product type 604a, and pulldown menu 600 of product options (colors). Upon the user selecting color 606a (the color Royal), dynamic webpage interface 600 further displayed information for the product/color option combination, including: sizes 616a . . . 616i, associated prices 611a . . . 611h, quantity fields 628a . . . 628i, and number of such items that were in stock in each size. The user then entered a quantity 614c of "10" in quantity field 626c. When complete, the user may select an order link, e.g., a save-to-cart-and-keep-shopping link 620a or a save-to-cart-and-checkout link 620b, as desired.

In an embodiment, dynamic webpage interface 600 may auto-populate a pre-determined color 606 upon selection of a product 604a . . . 604d. Thus, for example, with the user's selection of product 604a, and with an initial auto-populated color selected to be royal 606a, dynamic webpage interface 600 may display product type 604a, pulldown menu 600 of product options (colors) indicating royal 606a; sizes 616a . . . 616i, associated prices 611a . . . 611h, quantity fields 628a . . . 628i, and number of such items that are in stock in each size. If the user does not enter a quantity and instead uses the pulldown menu to select color 606b, interface 600 changes the display to show pulldown menu of product options (colors 606) indicating royal 606b; sizes 615a . . . 615i, associated prices 609a . . . 609h, quantity fields 626a . . . 626i, and number of such items that are in stock in each size.

In an embodiment, dynamic webpage interface 600 may additionally display an array of product options that are common to each of products 604a . . . 604d—e.g., in a manner such as color options 106 in FIG. 1A or color options 306 in FIG. 3. Upon selection of a common product option, dynamic webpage interface 600 may display selection indicators for each of product type 604a . . . 604d and their respective associated fields and information, with each initially auto-populated with such common product option.

In an embodiment, from the interface as it appears in FIG. 6, a next selection may be made by a user from the top listing of products 604a . . . 604d (as described above) and from any of the pulldown menus 606. That is, in the embodiment, if the user has entered quantity information for a selection indicator, e.g., selection indicator 610a, when the user subsequently uses the pulldown menu 606 associated with selection indicator 610a to change the color 610, interface 600 will create a new selection indicator for the product of selection indicator 610a and the newly selected color.

Figure 7A:
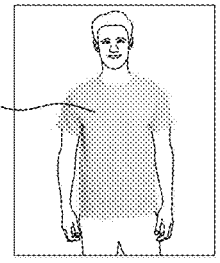
FIG. 7A and FIG. 7B, in combination, depict a screenshot of an embodiment of a dynamic webpage interface.
Figure 7A:
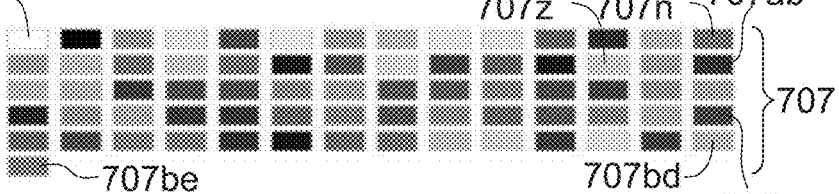
Figure 7A:
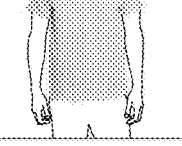
Figure 7B:
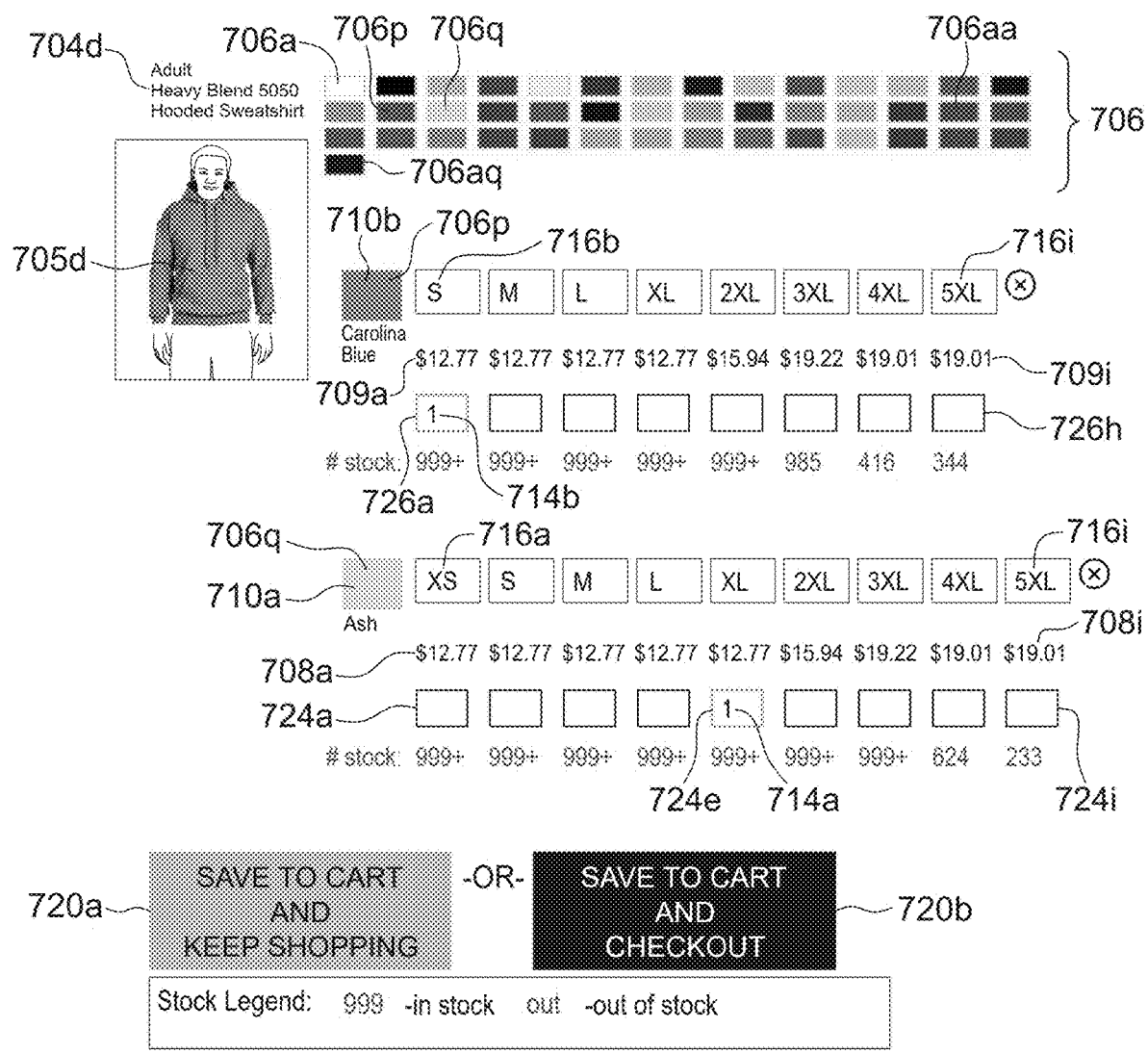

FIG. 7A and FIG. 7B, in combination, depict a screenshot 702 of an embodiment of a dynamic webpage interface 700. FIG. 7A and FIG. 7B depict screenshot 702 in the arrangement indicated on each figure. FIG. 7A and FIG. 7B illustrate an embodiment of a dynamic webpage interface that allows a user to create a custom order form that nests multiple selected products (e.g., any of product types 704a . . . 704d) and multiple selected options of each selected product (e.g., a set of colors 706 specific to selected product type 704d and a set of colors 707 specific to selected product type 704a). In many ways, dynamic webpage interface 700 merges the features of dynamic webpage interfaces 300 (selecting multiple product options of a single product) and 600 (selecting multiple products) to create a webpage that may expand with the selection of a product type and also may expand with the selection of a product option of the product type.

In FIG. 7A and FIG. 7B, dynamic webpage interface 700 may display a product type 704a . . . 704d and product image 705a . . . 705d and associated product information including: a starting price, a bulk price ("as low as . . . "); and additional information (e.g., "White: $3.32"). Screenshot 702 displays interface 700 after four selections have been made-two selections of product type 704d indicated by selection indicators 710a, 710b and two selections of product type 704a indicated by selection indicators 710c, 710d. After the first selection of product type 704d, Adult Heavy Blend 50/50 Hooded Sweatshirt, dynamic webpage interface 700 displayed: product type 704d; product image 705d; color options 706 with colors 706a . . . 706aq; a selection indicator 710a-a swatch of a pre-determined color; sizes; quantity fields; and number of such items that were in stock in each size. Upon the user selecting color 706q (the color Ash), dynamic webpage interface 700 displayed information updated for the selected product/color option combination, including: sizes 716a . . . 716i; prices 708a . . . 708i; quantity fields 724a . . . 724i; and quantity available in each size. Subsequently, the user then entered a quantity 714a of "1" in quantity field 724e, which resulted in dynamic webpage interface 700 "holding" selection 710a upon the user making a subsequent selection. At this point the user may select a second color from colors 706a . . . 706be associated with selection indicator 710a, or select a second product type 704a . . . 704d.

In the embodiment, similar to, e.g., dynamic webpage interfaces 100A, 100B, and dynamic webpage interface 300, if no quantity is provided in any of the quantity fields for a given product option (e.g., quantity fields 724a . . . 724i for color 706q), the selection indicator for the product option disappears upon the selection of a different product option. In other words, in the embodiment, the user must input a quantity for a selection indicator of a product option in order for that selection indicator to remain on the display after a different product option is selected.

Upon the user selecting color 706p (the color Carolina Blue), dynamic webpage interface 700 displayed in the more prominent position beneath colors 706a . . . 706aq associated with product type 704d: a selection indicator 710b and, associated with selection indicator 710b: sizes 716a . . . 716i; prices 709a . . . 709i; quantity fields 726a . . . 726i; and number of such items that were in stock in each size. Subsequently, the user then entered a quantity 714b of "1" in quantity field 726a, which resulted in dynamic webpage interface 700 "holding" selection 710b upon the user making a subsequent selection. At this point the user may select a third color from colors 706a . . . 706be associated with selection indicator 710b, or select a second product type 704a . . . 704d.

After the user selected product type 704a, Adult Heavy Cotton T-Shirt, dynamic webpage interface 700 displayed: product type 704a; product image 705a; color options 707 with colors 707a . . . 707be; a selection indicator 710c-a swatch of a pre-determined color; sizes; quantity fields; and number of such items that were in stock in each size. Upon the user selecting color 707n (the color Safety Pink), dynamic webpage interface 700 displayed information updated for the selected product/color combination, including: sizes 716b . . . 716g; prices 711a . . . 711i; quantity fields 728a . . . 728i; and quantity available in each size. Subsequently, the user then entered a quantity 714c of "2" in quantity field 728b, which resulted in dynamic webpage interface 700 "holding" selection 710c upon the user making a subsequent selection. At this point the user may select a second color from colors 706a . . . 706be associated with selection indicator 710c, or select a second product type 704a . . . 704d.

Upon the user selecting color 707z (the color Yellow Haze) from color options 707 associated with product type 704a, dynamic webpage interface 700 displayed in the more prominent position beneath colors 707a . . . 707be associated with product type 704a: a selection indicator 710c and, associated with selection indicator 710d: sizes 716b . . . 716i; prices 713a . . . 713i; quantity fields 730a . . . 730i; and number of such items that were in stock in each size. Subsequently, the user then entered a quantity 714d of "5" in quantity field 726d, which would result in interface 700 "holding" selection 710d upon the user making a subsequent selection—although no subsequent selection is shown.

It should be understood that the dynamic interface shown in screenshot 702 may have been arrived at by the user making the selections of product type and product option as just discussed (order: selection indicator 710a, 710b, 710c, 710d), or in any number of different combinations of steps, including the order represented by the following: selection indicator 710a and the associated fields, selection indicator 710c and the associated fields, selection indicator 710b and the associated fields, and selection indicator 710d and the associated fields. That is, in the embodiment, a user may initially select from between the product types 704a . . . 704d. Upon the user selecting a product type and entering a quantity, the user may then select from among the product types 704a . . . 704d or from among the product options associated with the previously selected product type (e.g., color options 706 associated with product type 704d or color options 707 associated with product type 704a).

In an embodiment, dynamic webpage interface 700 may auto-populate a pre-determined color 706 upon selection of a product type 704a . . . 704d, as was discussed with regard to dynamic webpage interface 600.

In an embodiment, if a user selects a product type 704a . . . 704d for a previously selected product type for which the selection indicator and associated text and fields are already displaying on the webpage, that selection indicator and associated text and fields may relocate to the most prominent location typically reserved for new selections, and the remaining selection indicators and associated text and fields may be relegated to less prominent locations. In an embodiment, if a user selects a product type 704a . . . 704d for a previously selected product type for which the selection indicator and associated text and fields are already displaying on the webpage, that selection indicator and associated text and fields may be re-sized so that they are a first size typically reserved for new selections, and the remaining selection indicators and associated text and fields may be smaller.

Figure 8:
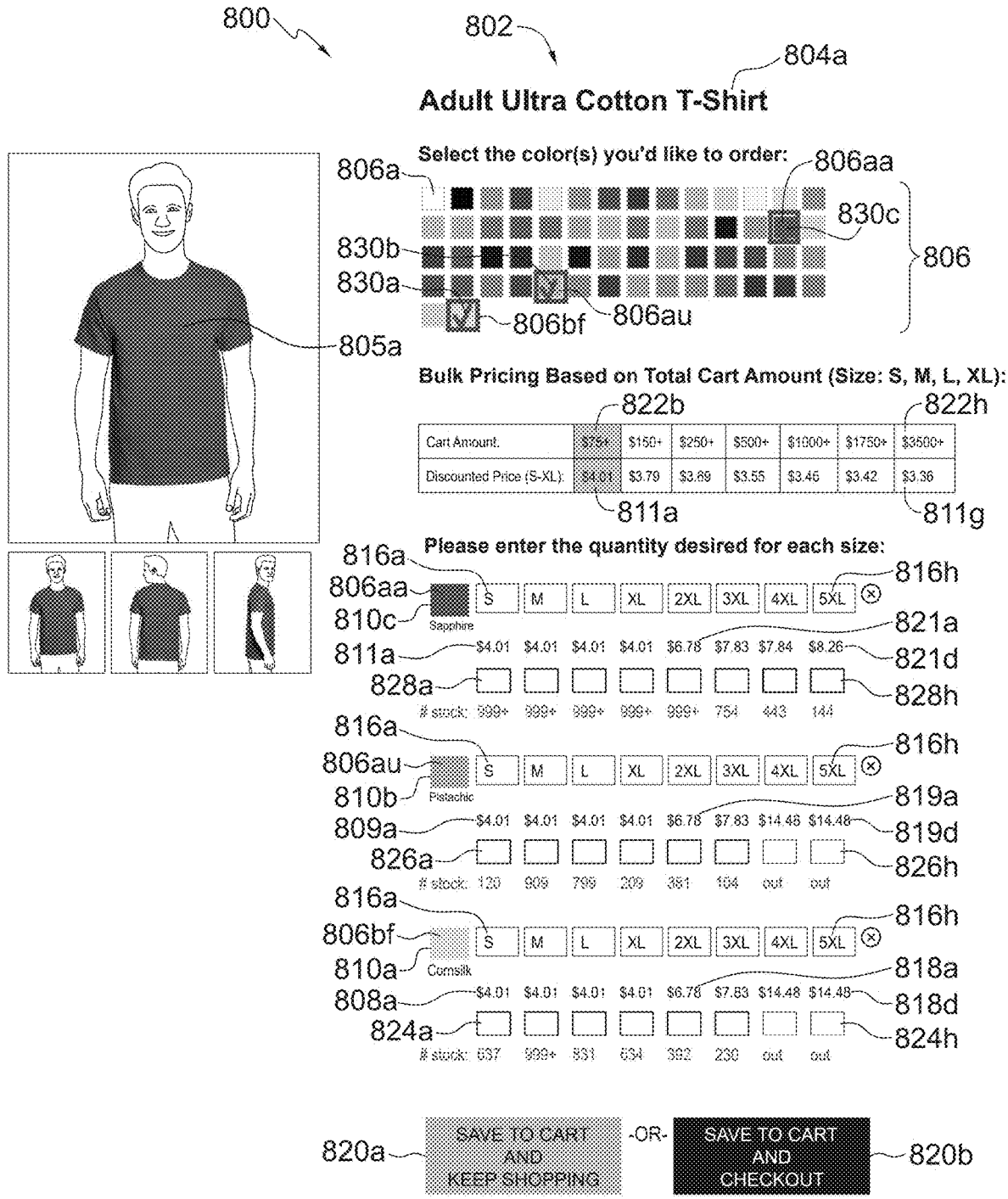
FIG. 8 is a screenshot of an embodiment of a dynamic webpage interface.

FIG. 8 is a screenshot 802 of an embodiment of a dynamic webpage interface 800. FIG. 8 illustrates a feature that may be implemented in any of dynamic webpage interfaces 100A, 100B, 300, 600, 700—the ability to select a number of products or product options and have the dynamic webpage expand to add a row for each selected product or product option and "hold" such row-even if a user has not made any further selection or input with regard to the selection (e.g., if a quantity has not been selected or entered for a previously selected product or product option). In FIG. 8, dynamic webpage interface 800 displays a product type 804a, product image 804b, associated product options including color options 806 (including colors 806a . . . 806bf), and bulk pricing information 811a . . . 811g (including bulk cart amounts 822a . . . 822h and associated prices 811a . . . 811h).

Screenshot 802 displays dynamic webpage interface 800 after selections of three product options, each selection indicated by a selection indicator 810a . . . 810c showing a swatch of the variant color selected and by a check mark 830a . . . 830c of the variant color in colors 806. No quantities have yet been provided for any selected product option. That is, upon the user selecting the color 806bf (the color Cornsilk), dynamic webpage interface 800 displayed check mark 830a and selection indicator 810a including a swatch of the selected color 806bf. Associated with selection indicator 810a, interface 800 displayed: a name of the swatch; sizes 816a . . . 816h; prices 808a, 818a . . . 818d for that product/color/size combination based on the current total dollar amount in the virtual shopping cart and of the quantities entered on the webpage (i.e., the $75.00 to $149.99 pricing tier); fields 824a . . . 824h for accepting a quantity of selection 810a for each size 816a . . . 816h, and a number of such items that were in stock in each size. Being the initial selection, selection indicator 810a and the associated fields were located prominently, i.e., just below 811a . . . 811g.

Upon the user selecting color 806au (the color Pistachio), dynamic webpage interface 800 displayed check mark 830b and selection indicator 810b including a swatch of the selected color 806au. Associated with selection indicator 810b, interface 800 displayed: a name of the swatch; sizes 816a . . . 816h; prices 809a, 819a . . . 819d for that product/color/size combination based on the current total dollar amount in the virtual shopping cart and of the quantities entered on the webpage (i.e., the $75.00 to $149.99 pricing tier); fields 826a . . . 826h for accepting a quantity of selection 810b for each size 816a . . . 816h, and a number of such items that were in stock in each size. Being the more recent selection, selection indicator 810b and the associated fields were located prominently and selection indicator 810a and associated field were moved down.

Upon the user selecting the color 806aa (the color Sapphire), dynamic webpage interface 800 displayed check mark 830c and selection indicator 810c including a swatch of the selected color 806aa. Associated with selection indicator 810b, interface 800 displayed: a name of the swatch; sizes 816a . . . 816h; prices 811a, 811a . . . 811d for that product/color/size combination based on the current total dollar amount in the virtual shopping cart and of the quantities entered on the webpage (i.e., the $75.00 to $149.99 pricing tier); fields 828a . . . 828h for accepting a quantity of selection 810c for each size 816a . . . 816h, and a number of such items that were in stock in each size. Being the more recent selection, selection indicator 810c and the associated fields were located prominently and selection indicator 810b and 810a and associated field were moved down. Thus, dynamic webpage interface 800 arrives at the configuration shown in screenshot 802 without the user entering a quantity. At any point, if the user should decide against any of the selected product variants, the user could deselect the checked color within colors 806 and the associated product indicator and associated field would be removed from the display.

In an embodiment, after a selection is made, e.g., of color 806bf, rather than indicating by displaying check mark 830a, that color may be highlighted in colors 806 or otherwise emphasized, or may be deleted from colors 806 or otherwise de-emphasized, to indicate to the user that the color has already been selected.

Figure 9:
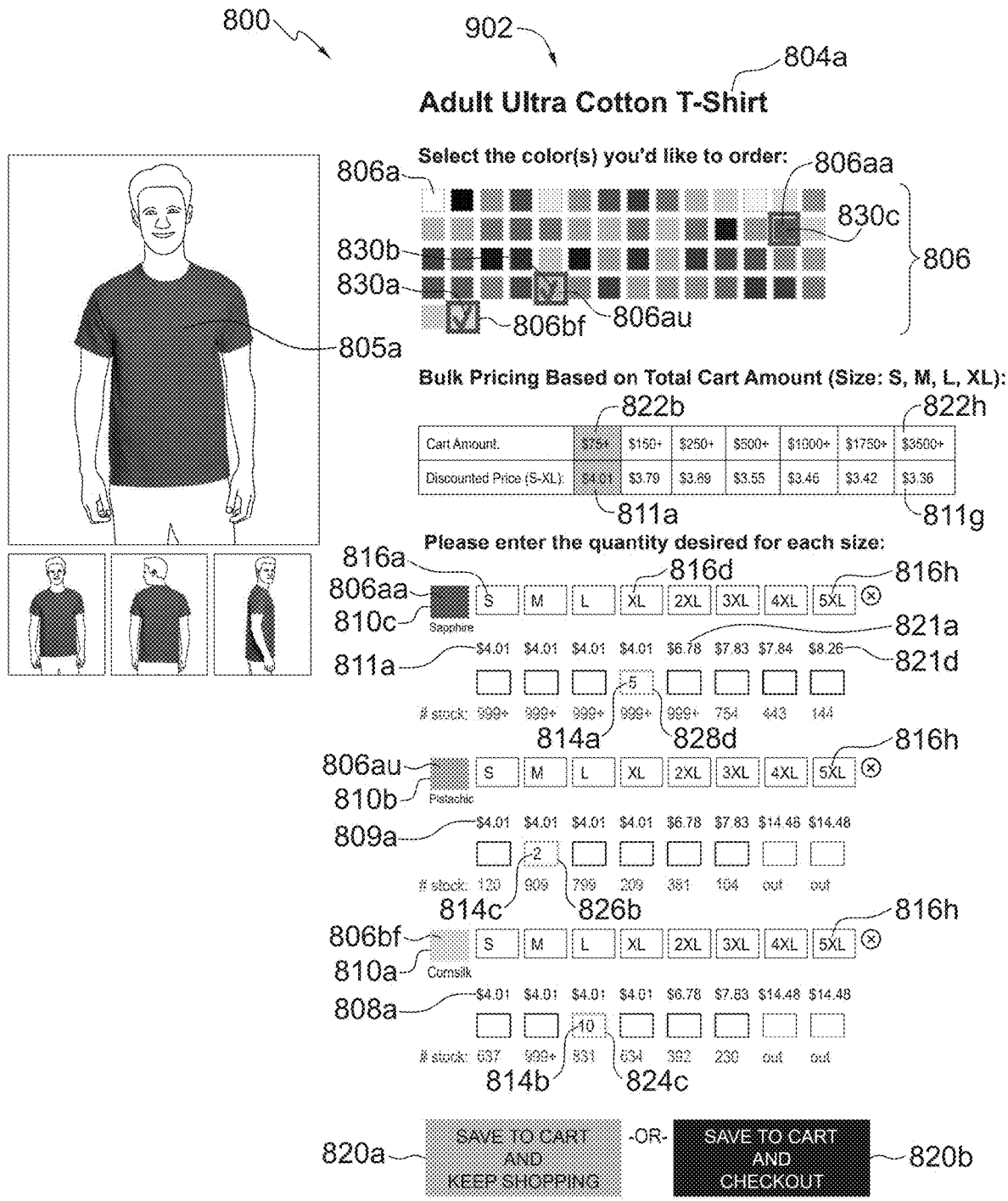
FIG. 9 is a screenshot of an embodiment of a dynamic webpage interface of FIG. 8.

FIG. 9 is a screenshot 902 of dynamic webpage interface 800 of FIG. 8. In FIG. 9, quantity fields 824c, 826b, and 828d have been provided by the user with quantities 814b, 814c, and 814a, respectively. The user may have provided quantities 814a . . . 814c in any order. Thus, FIG. 8 and FIG. 9 illustrate a feature in which a dynamic webpage may expand to display selection indicators for selected products or product options and associated fields, while giving the user additional optionality as to the timing of when further selections or input regarding indicated selections may provided (e.g., a user may wait until all selection indicators are displayed before providing further selections or input regarding indicated selections). In screenshot 902 the user may select an order link, such as a save-to-cart link 820a or a save-to-cart-and-check-out link 820b. The embodiment provides a user with the option to create a custom order form by selecting any product option the user contemplates purchasing. In an embodiment, with the click-to-select and display feature of dynamic webpage interface 800 is added to dynamic webpage interface 600, the combined features provide the user with the option to create an omnibus order form with all desired products and product options expanded by selecting any product type from an initial list, and then selecting any product option from a list provided with the selected product type.

Figure 10:
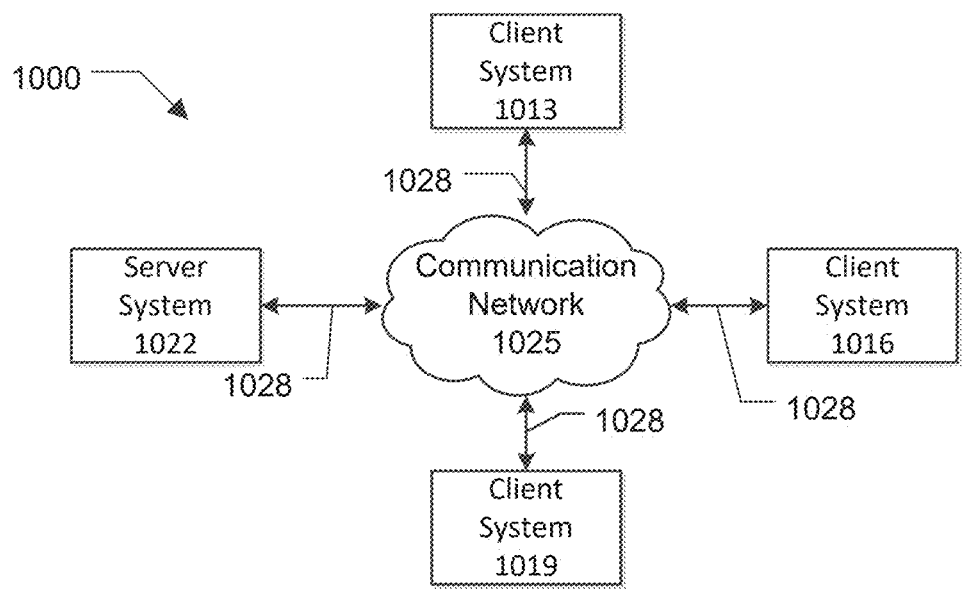
FIG. 10 is an exemplary block diagram depicting an embodiment of a system for implement embodiments of methods of the disclosure.

FIG. 10 is an exemplary block diagram depicting an embodiment of a system for implementing embodiments of methods of the disclosure, e.g., as described with reference to the previous figures. In FIG. 10, distributed computer network system 1000 includes a number of computing devices, e.g., client systems 1013, 1016, 1019, and one or more server systems 1022 coupled to a communication network 1025 via a plurality of communication links 1028. Communication network 1025 provides a mechanism for allowing the various components of distributed network 1000 to communicate and exchange information with each other. Thus, FIG. 10 describes systems, e.g., client systems

1013, 1016, 1019, for implementing elements of the above disclosure, e.g., dynamic webpage interfaces 100A, 100B, 300, 400, 600, 700, 800.

Communication network 1025 itself is comprised of one or more interconnected computer systems and communication links. Communication links 1028 may include hardwire links, optical links, satellite or other wireless communications links, wave propagation links, or any other mechanisms for communication of information. Various communication protocols may be used to facilitate communication between the various systems shown in FIG. 10. These communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols, Internet telephony, IP telephony, digital voice, voice over broadband (VoBB), broadband telephony, Voice over IP (VOIP), vendor-specific protocols, customized protocols, and others. While in one embodiment, communication network 1025 is the Internet, in other embodiments, communication network 1025 may be any suitable communication network including a local area network (LAN), a wide area network (WAN), a wireless network, a cellular network, a personal area network, an intranet, a private network, a near field communications (NFC) network, a public network, a switched network, a peer-to-peer network, and combinations of these, and the like.

In an embodiment, the server 1022 is not located near a user of a computing device, and is communicated with over a network. In a different embodiment, the server 1022 is a device that a user can carry upon his person, or can keep nearby. In an embodiment, the server 1022 has a large battery to power long distance communications networks such as a cell network (LTE, 5G), or Wi-Fi. The server 1022 communicates with the other components of the system via wired links or via low powered short-range wireless communications such as Bluetooth®. In an embodiment, one of the other components of the system plays the role of the server, e.g., the client system 1013.

Distributed computer network 1000 in FIG. 10 is merely illustrative of an embodiment incorporating the embodiments and does not limit the scope of the invention as recited in the claims. One of ordinary skill in the art would recognize other variations, modifications, and alternatives. For example, more than one server system 1022 may be connected to communication network 1025. As another example, a number of computing devices 1013, 1016, 1019 may be coupled to communication network 1025 via an access provider (not shown) or via some other server system.

Computing devices 1013, 1016, 1019 typically request information from a server system that provides the information. Server systems by definition typically have more computing and storage capacity than these computing devices, which are often such things as portable devices, mobile communications devices, or other computing devices that play the role of a client in a client-server operation. However, a particular computing device may act as both a client and a server depending on whether the computing device is requesting or providing information. Aspects of the embodiments may be embodied using a client-server environment or a cloud-cloud computing environment.

Server 1022 is responsible for receiving information requests from computing devices 1013, 1016, 1019, for performing processing required to satisfy the requests, and for forwarding the results corresponding to the requests back to the requesting computing device. The processing required to satisfy the request may be performed by server system 1022 or may alternatively be delegated to other servers connected to communication network 1025 or to other communications networks. A server 1022 may be located near the computing devices 1013, 1016, 1019 or may be remote from the computing devices 1013, 1016, 1019. A server 1022 may be a hub controlling a local enclave of things in an internet of things scenario.

Computing devices 1013, 1016, 1019 may enable users to access and query information or applications stored by server system 1022. Some example computing devices include portable electronic devices (e.g., mobile communications devices) such as the Apple iPhone®, the Apple iPad®, the Palm Pre™, or any computing device running the Apple IOS™, Android™ OS, Google Chrome OS, Symbian OS®, Windows 10, Windows Mobile® OS, Palm OS® or Palm Web OS™, or any of various operating systems used for Internet of Things (IoT) devices or automotive or other vehicles or Real Time Operating Systems (RTOS), such as the RIOT OS, Windows 10 for IoT, WindRiver VxWorks, Google Brillo, ARM Mbed OS, Embedded Apple IOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium μC/OS-II, Micrium μC/OS-III, Windows CE, TI-RTOS, RTEMS. Other operating systems may be used. In a specific embodiment, a "web browser" application executing on a computing device enables users to select, access, retrieve, or query information and/or applications stored by server system 1022. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 11:
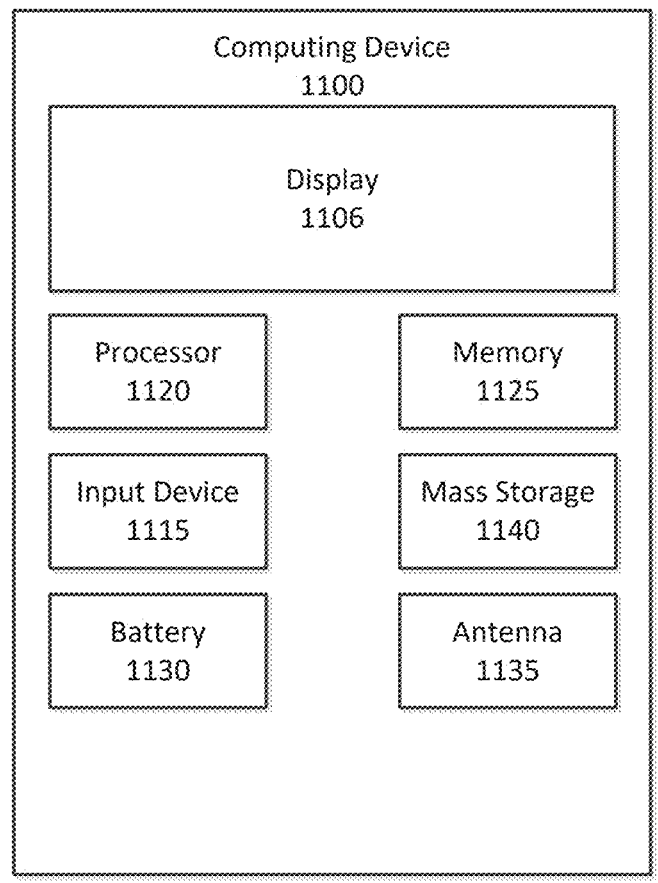
FIG. 11 is an exemplary block diagram depicting a computing device of an embodiment of a system.

FIG. 11 is an exemplary block diagram depicting a computing device 1100 for implementing embodiments of methods of the disclosure. Computing device 1100 may be any of the computing devices 1013, 1016, 1019 from FIG. 10. Computing device 1100 may include a display, screen, or monitor 1106, housing 1108, and input device 1115. Housing 1108 houses familiar computer components, some of which are not shown, such as a processor 1120, memory 1125, battery 1130, speaker, transceiver, antenna 1135, microphone, ports, jacks, connectors, camera, input/output (I/O) controller, display adapter, network interface, mass storage devices 1140, various sensors, and the like.

Input device 1115 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 1140 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, SD cards, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Embodiments may also be used with computer systems having different configurations, e.g., with additional or fewer subsystems, and may include systems provided by Arduino, or Raspberry Pi. For example, a computer system could include more than one processor (i.e., a multiprocessor system, which may permit parallel processing of information) or a system may include a cache memory. The computer system shown in FIG. 11 is but an example of a computer system suitable for use with the embodiments. Other configurations of subsystems suitable for use with the embodiments will be readily apparent to one of ordinary skill in the art. For example, in a specific implementation, the computing device is a mobile communications device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the embodiments may be embodied using, stored on, or associated with computer-readable medium. A computer-readable medium may include any medium that participates in providing instructions to one or more processors for execution, such as memory 1125 or mass storage 1140. Such a medium may take many forms including, but not limited to, nonvolatile, volatile, transmission, non-printed, and printed media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the embodiments may be stored or reside in RAM or cache memory, or on mass storage device 1140. The source code of this software may also be stored or reside on mass storage device 1140 (e.g., flash drive, hard disk, magnetic disk, tape, or CD-ROM). As a further example, code useful for practicing the embodiments may be transmitted via wires, radio waves, or through a network such as the Internet. In another specific embodiment, a computer program product including a variety of software program code to implement features of the embodiment is provided.

Computer software products may be written in any of various suitable programming languages, such as C, C++, C #, Pascal, Fortran, Perl, Matlab (from Math Works, www-.mathworks.com), SAS, SPSS, JavaScript, CoffeeScript, Objective-C, Swift, Objective-J, Ruby, Rust, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, Bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 10 or other Windows versions, Windows CE, Windows Mobile, Windows Phone, Windows 10 Mobile), Linux, HP-UX, UNIX, Sun OS, Solaris, Mac OS X, Alpha OS, AIX, IRIX32, or IRIX64, or any of various operating systems used for Internet of Things (IoT) devices or automotive or other vehicles or Real Time Operating Systems (RTOS), such as the RIOT OS, Windows 10 for IoT, WindRiver VxWorks, Google Brillo, ARM Mbed OS, Embedded Apple IOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium µC/OS-II, Micrium µC/OS-III, Windows CE, TI-RTOS, RTEMS. Other operating systems may be used.

Furthermore, the computer may be connected to a network and may interface to other computers using this network. The network may be an intranet, internet, or the Internet, among others. The network may be a wired network (e.g., using copper, and connections such as RS232 connectors), telephone network, packet network, an optical network (e.g., using optical fiber), or a wireless network, or any combination of these. For example, data and other information may be passed between the computer and components (or steps) of a system useful in practicing the embodiments using a wireless network employing a protocol such as Wi-Fi (IEEE standards 802.11, 802.11a, 802.11b, 802.11e, 802.11g, 802.11i, and 802.11n, just to name a few examples), or other protocols, such as BLUETOOTH or NFC or 802.15 or cellular, or communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols or the like. For example, signals from a computer may be transferred, at least in part, wirelessly to components or other computers.

Enumerated Embodiments

Embodiment 1, a method comprising:
displaying, by a computing system on an electronic display, a first product and a first plurality of product options;
while displaying the first product and first plurality product options, receiving, by the computing system, a first selection of a first product option from the first plurality of product options;
while displaying the first product and either the first plurality of product options or product options not selected from the first plurality of product options, displaying, by the computing system in response to the first selection, a first indicator of the first selection;
while displaying the first product, the first indicator, and either the first plurality of product options or product options not selected from the first plurality of product options, receiving, by the computing system, a second selection from the first plurality of product options; and
while displaying the first product, the first indicator, and either the first plurality of product options or product options not selected from the first plurality of product options, displaying, by the computing system in response to the second selection, a second indicator of the second selection.

Embodiment 2. The method of embodiment 1, further comprising:
   while displaying the first product, either the first plurality of product options or product options not selected from the first plurality of product options, and the second indicator, displaying, by the computing system in response to the first selection, a first field for receiving a quantity, amount, or other input regarding the first selection and displaying, and in response to the second selection, a second field for receiving a quantity, amount, or other input regarding the second selection.

Embodiment 3. The method of embodiment 2, further comprising:
   displaying, by the computing system in response to the first selection, at least one second product option associated with the first indicator and at least one third product option associated with the second indicator.

Embodiment 4. The method of embodiment 3, wherein:
   the at least one second product option includes a second plurality of product options;
   the at least one third product option includes a third plurality of product options;
   the displaying the first field for receiving the quantity, amount, or other input regarding the first selection includes displaying an instance of the first field for each product option in the second plurality of product options; and
   the displaying the second field for receiving the quantity, amount, or other input regarding the second selection includes displaying an instance of the second field for each product option in the third plurality of product options.

Embodiment 5. The method of embodiment 1, further comprising:
   moving, by the computing system, the first indicator from a first location to a second location on the display, wherein:
   displaying, by the computing system in response to the second selection, a second indicator of the second selection, includes:
   displaying, by the computing system in response to the second selection, the second indicator of the second selection at the first location.

Embodiment 6. The method of embodiment 5, further comprising:
   while displaying the first product, either the first plurality of product options or product options not selected from the first plurality of product options, and the second indicator, displaying, by the computing system in response to the first selection, a first field for receiving a quantity, amount, or other input regarding the first selection and displaying, and in response to the second selection, a second field for receiving a quantity, amount, or other input regarding the second selection;
   receiving, by the computing system, a first quantity, amount, or other input in the first field and a second quantity, amount, or other input in the second field; and
   receiving, by the computing system, an order of the first quantity, amount, or other input regarding the first selection and the second quantity, amount, or other input regarding the second selection when an order link is selected.

Embodiment 7. The method of embodiment 1, wherein:
   while displaying the first product, the first indicator, and either the first plurality of product options or product options not selected from the first plurality of product options, displaying, by the computing system in response to the second selection, a second indicator of the second selection, includes:
   displaying the first indicator relatively smaller than the second indicator.

Embodiment 8. A method comprising:
   displaying, by a computing system on an electronic display, a first plurality of products;
   while displaying the first plurality of products, receiving, by the computing system, a first selection of a first product from the first plurality of products;
   while displaying either the first plurality of products or products not selected from the first plurality of products, displaying, by the computing system in response to the first selection, a first indicator of the first selection;
   while displaying the first indicator, the first field, and either the first plurality of products or products not selected from the first plurality of products, receiving, by the computing system, a second selection from the first plurality of products; and
   while displaying the first indicator and either the first plurality of products or products not selected from the first plurality of products, displaying, by the computing system in response to the second selection, a second indicator of the second selection.

Embodiment 9. The method of embodiment 8, the method further comprising:
   while displaying the first indicator, either the first plurality of products or products not selected from the first plurality of products, and the second indicator, displaying, by the computing system in response to the first selection, a first field for receiving a quantity, amount, or other input regarding the first selection and displaying, by the computing system in response to the second selection a second field for receiving a quantity, amount, or other input regarding the second selection.

Embodiment 10. The method of embodiment 9, the method further comprising:
   displaying, by the computing system in response to the first selection, at least one second product option associated with the first indicator; and
   displaying, by the computing system in response to the second selection, at least one third product option associated with the second indicator.

Embodiment 11. The method of embodiment 10, wherein:
   the at least one second product option includes a second plurality of product options;
   the at least one third product option includes a third plurality of product options;
   the displaying the first field for receiving the quantity, amount, or other input regarding the first selection includes displaying an instance of the first field for each product option in the second plurality of product options; and
   the displaying the second field for receiving the quantity, amount, or other input regarding the second selection includes displaying an instance of the second field for each product option in the third plurality of product options.

Embodiment 12. A method comprising:
   displaying, by a computing system on an electronic display, a first plurality of products;
   while displaying the first plurality of products, receiving, by the computing system, a first selection of a first product from the first plurality of products;
   while displaying either the first plurality of products or products not selected from the first plurality of products, displaying, by the computing system in response to the first selection, a first indicator of the first selection and a first plurality of product options;

while displaying the first indicator, the first plurality of product options, and either the first plurality of products or products not selected from the first plurality of products, receiving, by the computing system, a second selection from the first plurality of product options; and while displaying the first indicator and either the first plurality of products or products not selected from the first plurality of products, displaying, by the computing system in response to the second selection, a second indicator of the second selection.

Embodiment 13. The method of embodiment 12, the method further comprising:

while displaying the first indicator, either the first plurality of products or products not selected from the first plurality of products, and the second indicator, displaying, by the computing system in response to the first selection, a first field for receiving a quantity, amount or other input regarding the first selection and, in response to the second selection, a second field for receiving a quantity, amount, or other input regarding the second selection.

Embodiment 14. The method of embodiment 13, the method further comprising:

while displaying the first indicator, the first field, the second indicator, the second field, and either the first plurality of products or products not selected from the first plurality of products, receiving, by the computing system, a third selection from the first plurality of products; and while displaying the first indicator, the first field, the second indicator, the second field, and either the first plurality of products or products not selected from the first plurality of products, displaying, by the computing system, a third indicator of the third selection and a third field for receiving a quantity, amount, or other input regarding the third selection.

Embodiment 15. A computing system comprising at least one processor and memory and instructions that when executed by the at least one processor cause the system to:

display, on an electronic display, a first product and a first plurality of product options;

while displaying the first product and first plurality product options, receive a first selection of a first product option from the first plurality of product options;

while displaying the first product and either the first plurality of product options or product options not selected from the first plurality of product options, display, in response to the first selection, a first indicator of the first selection;

while displaying the first product, the first indicator, and either the first plurality of product options or product options not selected from the first plurality of product options, receive a second selection from the first plurality of product options; and while displaying the first product, the first indicator, and either the first plurality of product options or product options not selected from the first plurality of product options, display, in response to the second selection, a second indicator of the second selection. Embodiment 16. The computing system of embodiment 15, further including instructions that when executed by the at least one processor cause the computing system to:

while displaying the first product, either the first plurality of product options or product options not selected from the first plurality of product options, and the second indicator, display, by the computing system in response to the first selection, a first field for receiving a quantity, amount, or other input regarding the first selection and, in response to the second selection, a second field for receiving a quantity, amount, or other input regarding the second selection. Embodiment 17. The computing system of embodiment 16, further including instructions that when executed by the at least one processor cause the computing system to:

display, in response to the first selection, at least one second product option associated with the first indicator and at least one third product option associated with the second indicator.

Embodiment 18. The computing system of embodiment 17, wherein:

the at least one second product option includes a second plurality of product options;

the at least one third product option includes a third plurality of product options;

the displaying the first field for receiving the quantity, amount, or other input regarding the first selection includes displaying an instance of the first field for each product option in the second plurality of product options; and displaying the second field for receiving the quantity, amount, or other input regarding the second selection includes displaying an instance of the second field for each product option in the third plurality of product options.

Embodiment 19. The computing system of embodiment 16, further including instructions that when executed by the at least one processor cause the system to:

move the first indicator from a first location to a second location on the display, wherein:

displaying, in response to the second selection, a second indicator of the second selection, includes:

displaying, in response to the second selection, the second indicator of the second selection at the first location.

Embodiment 20. The computing system of embodiment 19, further including instructions that when executed by the at least one processor cause the system to:

while displaying the first product, either the first plurality of product options or product options not selected from the first plurality of product options, and the second indicator, display, by the computing system in response to the first selection, a first field for receiving a quantity, amount, or other input regarding the first selection and displaying, and in response to the second selection, a second field for receiving a quantity, amount, or other input regarding the second selection;

receive a first quantity, amount, or other input in the first field and a second quantity, amount, or other input in the second field; and receive an order of the first quantity, amount, or other input regarding the first selection and the second quantity, amount, or other input regarding the second selection when an order link is selected.

Embodiment 21. A non-transitory, computer-readable storage medium having stored thereon a plurality of instructions, which, when executed by a processor of a computing system, cause the computing system to:

display, on an electronic display, a first product and a first plurality of product options;

while displaying the first product and first plurality product options, receive a first selection of a first product option from the first plurality of product options;

while displaying the first product and either the first plurality of product options or product options not selected from the first plurality of product options, display, in response to the first selection, a first indicator of the first selection;

while displaying the first product, the first indicator, and either the first plurality of product options or product options not selected from the first plurality of product options, receive a second selection from the first plurality of product options; and while displaying the first product, the first indicator, and either the first plurality of product options or product options not selected from the first plurality of product options, display, in response to the second selection, a second indicator of the second selection. Embodiment 22. The non-transitory, computer-readable storage medium of embodiment 21, further including instructions, which, when executed by a processor of a computing system, cause the computing system to:

while displaying the first product, either the first plurality of product options or product options not selected from the first plurality of product options, and the second indicator, display, by the computing system in response to the first selection, a first field for receiving a quantity, amount, or other input regarding the first selection and, in response to the second selection, a second field for receiving a quantity, amount, or other input regarding the second selection. Embodiment 23. The non-transitory, computer-readable storage medium of embodiment 22, further including instructions, which, when executed by a processor of a computing system, cause the computing system to:

display, in response to the first selection, at least one second product option associated with the first indicator and at least one third product option associated with the second indicator. Embodiment 24. The non-transitory, computer-readable storage medium of embodiment 23, wherein:

the at least one second product option includes a second plurality of product options;

the at least one third product option includes a third plurality of product options;

the displaying the first field for receiving the quantity, amount, or other input regarding the first selection includes displaying an instance of the first field for each product option in the second plurality of product options; and displaying the second field for receiving the quantity, amount, or other input regarding the second selection includes displaying an instance of the second field for each product option in the third plurality of product options.

Embodiment 25. The non-transitory, computer-readable storage medium of embodiment 22, further including instructions, which, when executed by a processor of a computing system, cause the computing system to:

move the first indicator from a first location to a second location on the display, wherein:

displaying, in response to the second selection, a second indicator of the second selection, includes:

displaying, in response to the second selection, the second indicator of the second selection at the first location.

Embodiment 26. The non-transitory, computer-readable storage medium of embodiment 25, further including instructions, which, when executed by a processor of a computing system, cause the computing system to:

while displaying the first product, either the first plurality of product options or product options not selected from the first plurality of product options, and the second indicator, display, by the computing system in response to the first selection, a first field for receiving a quantity, amount, or other input regarding the first selection and displaying, and in response to the second selection, a second field for receiving a quantity, amount, or other input regarding the second selection;

receive a first quantity, amount, or other input in the first field and a second quantity, amount, or other input in the second field; and receive an order of the first quantity, amount, or other input regarding the first selection and the second quantity, amount, or other input regarding the second selection when an order link is selected.

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A method comprising:

displaying, by a computing system connected by a network to at least one server, and including at least one processor and memory provided with instructions, which when executed by the at least one processor cause the computing system to provide a dynamic interface on an electronic display, using the dynamic interface, a first product and a first plurality of auto-populated product options regarding a first aspect of the first product, the first plurality of auto-populated product options being auto-populated on the electronic display by the computing system in response to an initial selection of the first product, selection of a product option from the plurality requiring a user use an input device to cause the dynamic interface to select an area of the electronic display associated with the product option;

while the computing system is maintaining the display of the first product and first plurality of auto-populated product options, receiving, by the computing system by way of a first input from the user using the input device to interact with the dynamic interface, a first selection of a first product option from the first plurality of auto-populated product options;

while the computing system is maintaining the display of the first product and either the first plurality of auto-populated product options or product options not selected from the first plurality of auto-populated product options, displaying on the electronic display, by the computing system using the dynamic interface in response to the first selection according to instructions in the memory, a first indicator of the first selection and a first field for receiving an indication of a positive, non-zero quantity or amount of the first selection;

while the computing system is maintaining the display of the first product, the first indicator, the first field, and either the first plurality of auto-populated product options or product options not selected from the first plurality of auto-populated product options, receiving, by the computing system by way of a second input from the user using the input device to interact with the dynamic interface, a second selection from the first plurality of auto-populated product options;

while the computing system is maintaining the display of the first product and either the first plurality of auto-populated product options or product options not selected from the first plurality of auto-populated product options:

displaying on the electronic display, by the computing system using the dynamic interface, in response to the second selection according to instructions stored in memory, a second indicator of the second selection and a second field for receiving an indication of a positive, non-zero quantity or amount of the first selection; and ceasing to display, by the computing system in response to the second selection, the first indicator and the first field, only when no indication of a positive, non-zero quantity or amount of the first selection was received by the first field before the receipt of the second selection.

2. The method of claim 1, further comprising:

receiving, by the first field by the computing system by way of a third input from the user into the first field using the dynamic interface, an indication of a positive, non-zero quantity or amount of the first selection; and, while maintaining the display of the first product, the first indicator, the first field, the second indicator, the second field, and either the first plurality of auto-populated product options or product options not selected from the first plurality of auto-populated product options:

displaying on the electronic display, by the computing system in response to the first selection, at least one second product option associated with the first indicator and in response to the second selection, at least one third product option associated with the second indicator.

3. The method of claim 2, wherein:

the at least one second product option includes a second plurality of auto-populated product options;

the at least one third product option includes a third plurality of auto-populated product options;

the displaying the first field for receiving the indication of a positive, non-zero quantity or amount of the first selection includes displaying an instance of the first field for each product option in the second plurality of auto-populated product options; and the displaying the second field for receiving the indication of a positive, non-zero quantity or amount, of the second selection includes displaying an instance of the second field for each product option in the third plurality of auto-populated product options.

4. The method of claim 1, further comprising:

receiving, by the first field by the computing system by way of a third input from the user using the dynamic interface, an indication of a positive, non-zero quantity or amount, of the first selection, wherein:

the first indicator is displayed at a first location of the electronic display;

the first field is displayed on a second location of the electronic display;

displaying, by the computing system in response to the second selection of the plurality of selections, a second indicator of the second selection, includes:

moving, by the computing system, the first indicator from the first location to a third location on the electronic display;

moving, by the computing system, the first field from the second location to a fourth location on the electronic display; and displaying, by the computing system using the dynamic interface in response to the second selection, the second indicator of the second selection at the first location and the second field at the second location.

5. The method of claim 4, further comprising:

receiving, by the computing system, an order of the first positive, non-zero quantity or amount of the first selection and the second positive, non-zero quantity or amount of the second selection when an order link displayed on the dynamic interface is selected.

6. A method comprising:

displaying, by a computing system connected by a network to at least one server, and including at least one processor and memory provided with instructions, which when executed by the at least one processor cause the computing system to provide a dynamic interface on an electronic display, using the dynamic interface, a first plurality of auto-populated products, the first plurality of auto-populated products being auto-populated on the electronic display by the computing system in response to an initial access of a webpage, selection of a product from the first plurality requiring a user use an input device to cause the dynamic interface to select an area of the electronic display associated with the product;

while the computing system is maintaining the display of the first plurality of auto-populated products, receiving, by the computing system by way of a first input from the user using the input device to interact with the dynamic interface, a first selection of a first product from the first plurality of auto-populated products;

while the computing system is maintaining the display of either the first plurality of auto-populated products or products not selected from the first plurality of auto-populated products, displaying on the electronic display, by the computing system using the dynamic interface in response to the first selection according to instructions in the memory, a first indicator of the first selection and a first field for receiving an indication of a positive, non-zero quantity or amount of the first selection;

while the computing system is maintaining the display of the first indicator, the first field, and either the first plurality of auto-populated products or products not selected from the first plurality of auto-populated products, receiving, by the computing system by way of a second input from the user using the dynamic interface, a second selection from the first plurality of auto-populated products; and while the computing system is maintaining the display of the first indicator and either the first plurality of auto-populated products or products not selected from the first plurality of auto-populated products:

displaying on the electronic display, by the computing system using the dynamic interface in response to the second selection, a second indicator of the second selection and a second field for receiving an indication of a positive, non-zero quantity or amount of the second selection; and ceasing to display, by the computing system in response to the second selection, the first indicator and the first field only when no indication of a positive, non-zero quantity or amount of the first selection was received by the first field before the receipt of the second selection.

7. The method of claim 6, further comprising, while maintaining the display of the first product, the first indicator, the second indicator, the first field, and either the first plurality of auto-populated products or products not selected from the first plurality of auto-populated product options:

displaying on the electronic display, by the computing system in response to the first selection, at least one first product option associated with the first indicator; and displaying on the electronic display, by the computing system in response to the second selection, at least one second product option associated with the second indicator.

8. The method of claim 7, wherein:

the at least one first product option includes a first plurality of auto-populated product options;

the at least one second product option includes a second plurality of auto-populated product options;

the displaying the first field for receiving the indication of a positive, non-zero quantity or amount of the first selection includes displaying an instance of the first field for each product option in the first plurality of auto-populated product options; and the displaying the second field for receiving the indication of a positive, non-zero quantity or amount of the second selection includes displaying an instance of the second field for each product option in the second plurality of auto-populated product options.

9. A method comprising:

displaying, by a computing system connected by a network to at least one server, and including at least one processor and memory provided with instructions, which when executed by the at least one processor cause the computing system to provide a dynamic interface on an electronic display, using the dynamic interface, a first plurality of auto-populated products the first plurality of auto-populated products being auto-populated on the electronic display by the computing system in response to an initial access of a webpage, selection of a product from the first plurality of auto-populated products requiring a user use an input device to cause the dynamic interface to select an area of the electronic display associated with the product;

while the computing system is maintaining the display of the first plurality of auto-populated products, receiving, by the computing system by way of a first input from the user using the input device to interact with the dynamic interface, a first selection of a first product from the first plurality of auto-populated products;

while the computing system is maintaining the display of either the first plurality of auto-populated products or products not selected from the first plurality of auto-populated products, displaying on the electronic display, by the computing system using the dynamic interface in response to the first selection according to instructions in the memory, a first indicator of the first selection and a first plurality of auto-populated product options;

while the computing system is maintaining the display of the first indicator, the first plurality of auto-populated product options, and either the first plurality of auto-populated products or products not selected from the first plurality of auto-populated products, receiving, by the computing system by way of a second input from the user using the input device to interact with the dynamic interface, a second selection of a first product option from the first plurality of auto-populated product options;

while the computing system is maintaining the display of the first indicator, the first plurality of auto-populated product options, and either the first plurality of auto-populated products or products not selected from the first plurality of auto-populated products, displaying, by the computing system using the dynamic interface in response to the second selection according to instructions in the memory, a second indicator of the second selection, and a first field for receiving an indication of a positive, non-zero quantity or amount of the first product option from the first plurality of auto-populated product options;

while the computing system is maintaining the display of the first indicator, the first plurality of auto-populated product options, the second indicator, the first field, and either the first plurality of auto-populated products or products not selected from the first plurality of auto-populated products, receiving, by the computing system by way of a third input from the user using the dynamic interface, a third selection of a second product option from the first plurality of auto-populated product options;

while the computing system is maintaining the display of the first indicator, the first plurality of auto-populated product options, the second indicator, the first field, and either the first plurality of auto-populated products or products not selected from the first plurality of auto-populated products:

displaying, by the computing system using the dynamic interface in response to the third selection according to instructions stored in memory, a third indicator of the third selection, and a second field for receiving an indication of a positive, non-zero quantity or amount of the second product option; and ceasing to display, by the computing system in response to the third selection, the second indicator and second field only when no indication of a positive, non-zero quantity or amount was received by the second field before the receipt of the third selection.

10. The method of claim 9, the method further comprising:

receiving, by the first field by the computing system by way of a fourth input from the user using the dynamic interface, an indication of a positive, non-zero quantity or amount, of the second selection;

receiving, by the second field by the computing system by way of a fifth input from the user using the dynamic interface, an indication of a positive, non-zero quantity or amount, of the third selection;

while maintaining the display of the first indicator, the first field, the second indicator, the second field, the third indicator, and either the first plurality of auto-populated products or products not selected from the first plurality of auto-populated products, receiving, by the computing system by way of a sixth input from the user using the dynamic interface, a fourth selection of a third product option from the first plurality of auto-populated product options; and while maintaining the display of the first indicator, the first field, the second indicator, the second field, the third indicator, and either the first plurality of auto-populated products or products not selected from the first plurality of auto-populated products, displaying, by the computing system, a fourth indicator of the fourth selection and a third field for receiving an indication of a positive, non-zero quantity or amount of the fourth selection.

11. A method comprising:

displaying, by a computing system connected by a network to at least one server, and including at least one processor and memory provided with instructions, which when executed by the at least one processor cause the computing system to provide a dynamic interface on an electronic display, using the dynamic interface, a first product and a first plurality of auto-populated product options, the first plurality of auto-populated product options being auto-populated on the electronic display by the computing system in response to an initial selection of the first product, selection of a product option from the plurality requiring a user use an input device to cause the dynamic interface to select an area of the electronic display associated with the auto-populated product option;

while the computing system is maintaining the display of the first product and first plurality of auto-populated product options, receiving, by the computing system by way of a first input from the user using the input device to interact with the dynamic interface, a first selection of a first product option from the first plurality of auto-populated product options;

while maintaining the display of the first product and only product options not selected from the first plurality of auto-populated product options, displaying on the electronic display, by the computing system using the dynamic interface in response to the first selection according to instructions in the memory, a first indicator of the first selection and a first field for receiving an indication of a positive, non-zero quantity or amount, of the first selection;

while the computing system is maintaining the display of the first product, the first indicator, the first field, and only product options not selected from the first plurality of auto-populated product options, receiving, by the computing system by way of a second input from the user using the dynamic interface, a second selection of a second product option from the first plurality of auto-populated product options; and while the computing system is maintaining the display of the first product and only product options not selected from the first plurality of auto-populated product options:

displaying on the electronic display, by the computing system using the dynamic interface in response to the second selection according to instructions stored in memory, a second indicator of the second selection and a second field for receiving an indication of a positive, non-zero quantity or amount of the second selection; and ceasing to display, by the computing system in response to the second selection, the first indicator and the first field only when no indication of a positive, non-zero quantity or amount of the first selection was received by the first field before the receipt of the second selection.

12. The method of claim 11, further comprising, while maintaining the display of the first product and only product options not selected from the first plurality of auto-populated product options:

displaying, by the computing system in response to the first selection of the first product option, at least one third product option associated with the first indicator and in response to the second selection of the second product option, at least one fourth product option associated with the second indicator.

13. The method of claim 12, wherein:

the at least one third product option includes a second plurality of auto-populated product options;

the at least one fourth product option includes a third plurality of auto-populated product options;

the displaying the first field for receiving the indication of a positive, non-zero quantity or amount of the first selection includes displaying an instance of the first field for each product option in the second plurality of auto-populated product options; and the displaying the second field for receiving the indication of a positive, non-zero quantity or amount of the second selection includes displaying an instance of the second field for each product option in the third plurality of auto-populated product options.

14. The method of claim 11, wherein displaying, by the computing system in response to the second selection, the second indicator of the second selection from the first plurality of auto-populated product options, includes:

moving, by the computing system in response to the second selection, the first indicator and the first field from a first location to a second location on the electronic display; and displaying, by the computing system in response to the second selection, the second indicator and the second field at the first location.

15. The method of claim 14, further comprising:

receiving, by the first field by the computing system, a first quantity, amount, or other affirmative indication of acceptance or selection, and by the second field by the computing system, a second indication of a positive, non-zero quantity or amount; and receiving, by the computing system, an order of the first positive, non-zero quantity or amount of the first selection and the second positive, non-zero quantity or amount of the second selection when an order link displayed on the dynamic interface is selected.

16. The method of claim 1, further comprising:
while the computing system is maintaining the display of the first product and either the first plurality of auto-populated product options or product options not selected from the first plurality of auto-populated product options, displaying, by the computing system using the dynamic interface in response to: a plurality of selections, the plurality of selections including the second selection; and an associated indication of a positive, non-zero quantity or amount, of each of the plurality of selections, except for the first selection:
- a plurality of indicators, the plurality of indicators including the second indicator and not the first indicator; and
- a plurality of fields, each field for receiving an indication of a positive, non-zero quantity or amount of one of the plurality of selections, the plurality of fields including the second field and not the first field, wherein:

the ceasing to display the first indicator and first field when no indication of a positive, non-zero quantity or amount of the first selection was received before the receipt of the second selection provides space on the electronic display for displaying at least one more indicator and field than a displaying in which the ceasing to display the first indicator and first field is not performed.

17. The method of claim 16, wherein the plurality of indicators, including the first indicator and the second indicator, are graphical indicators.

* * * * *